Herman F. Russell
INVENTOR.

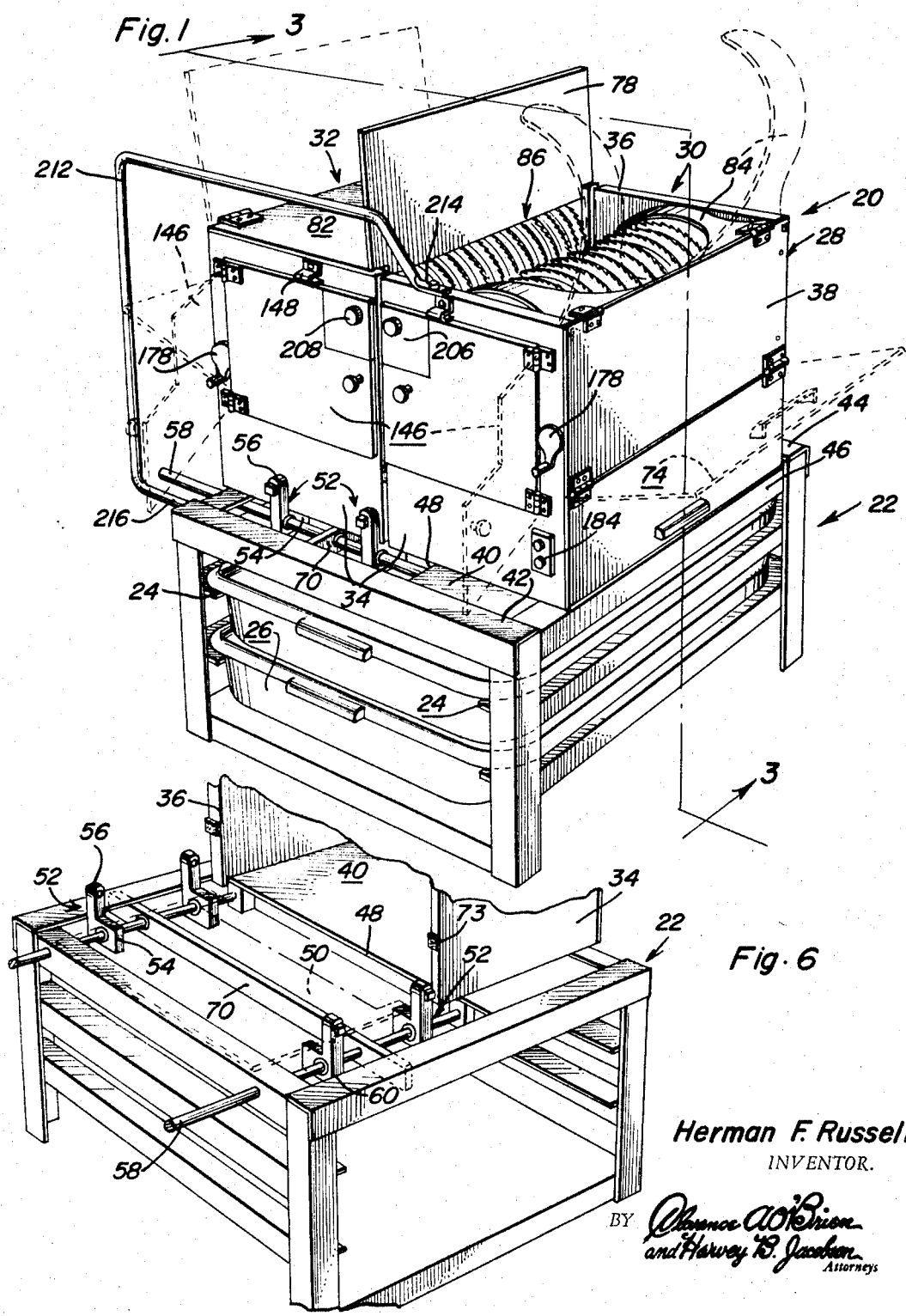

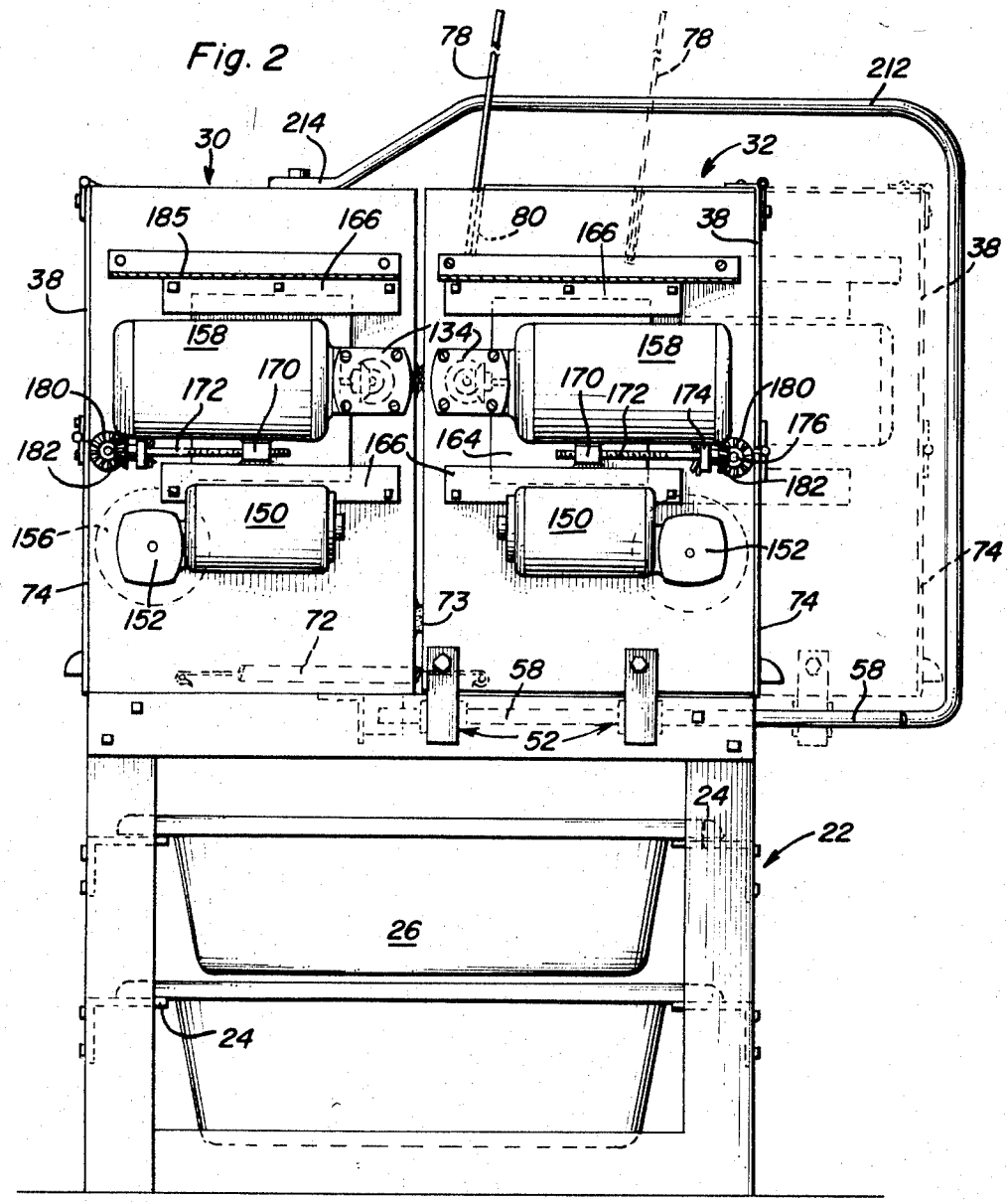
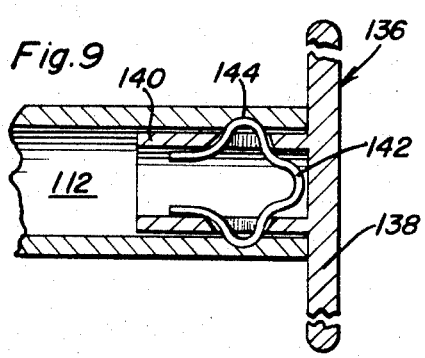

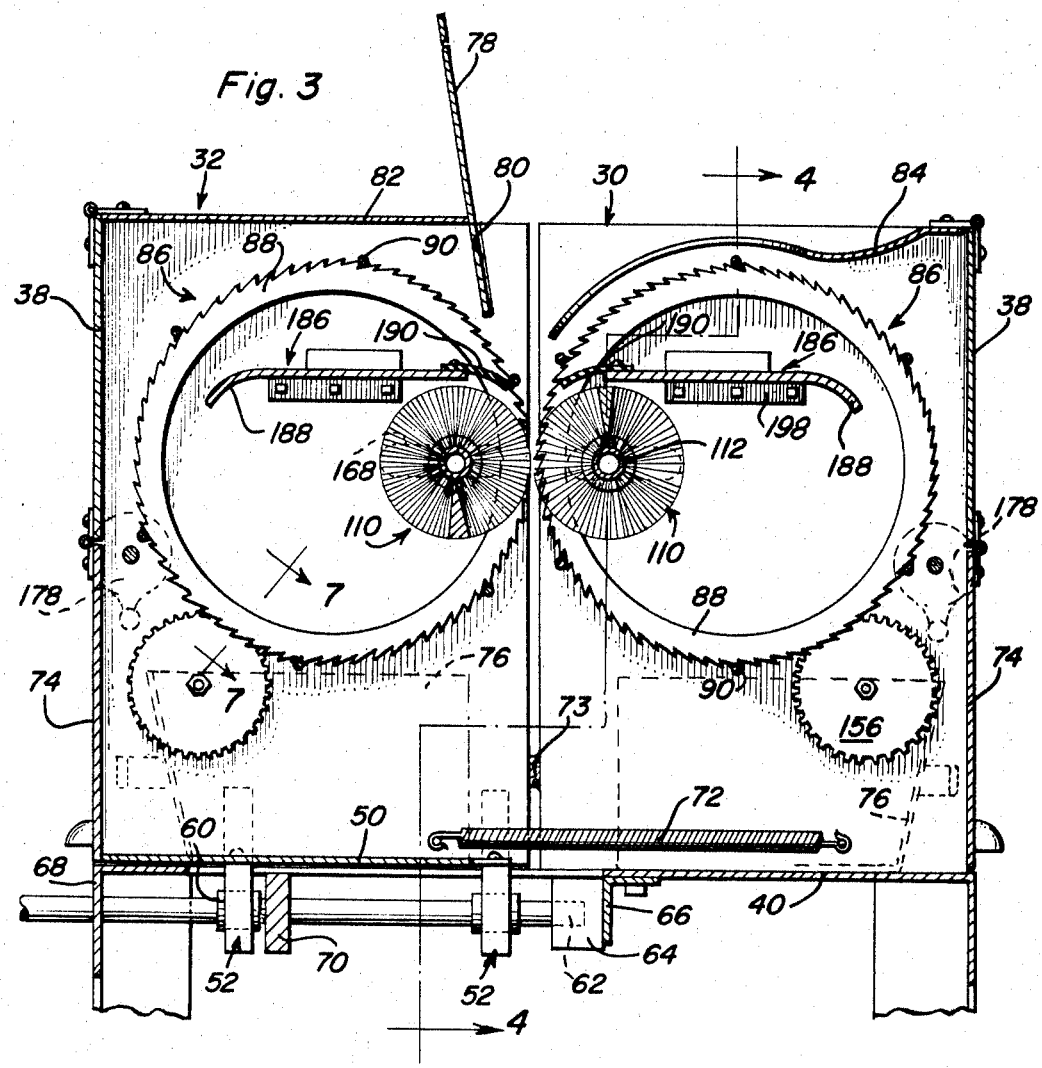
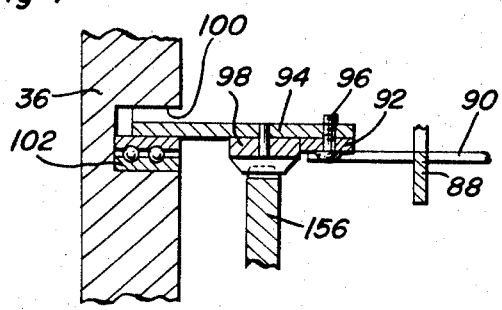

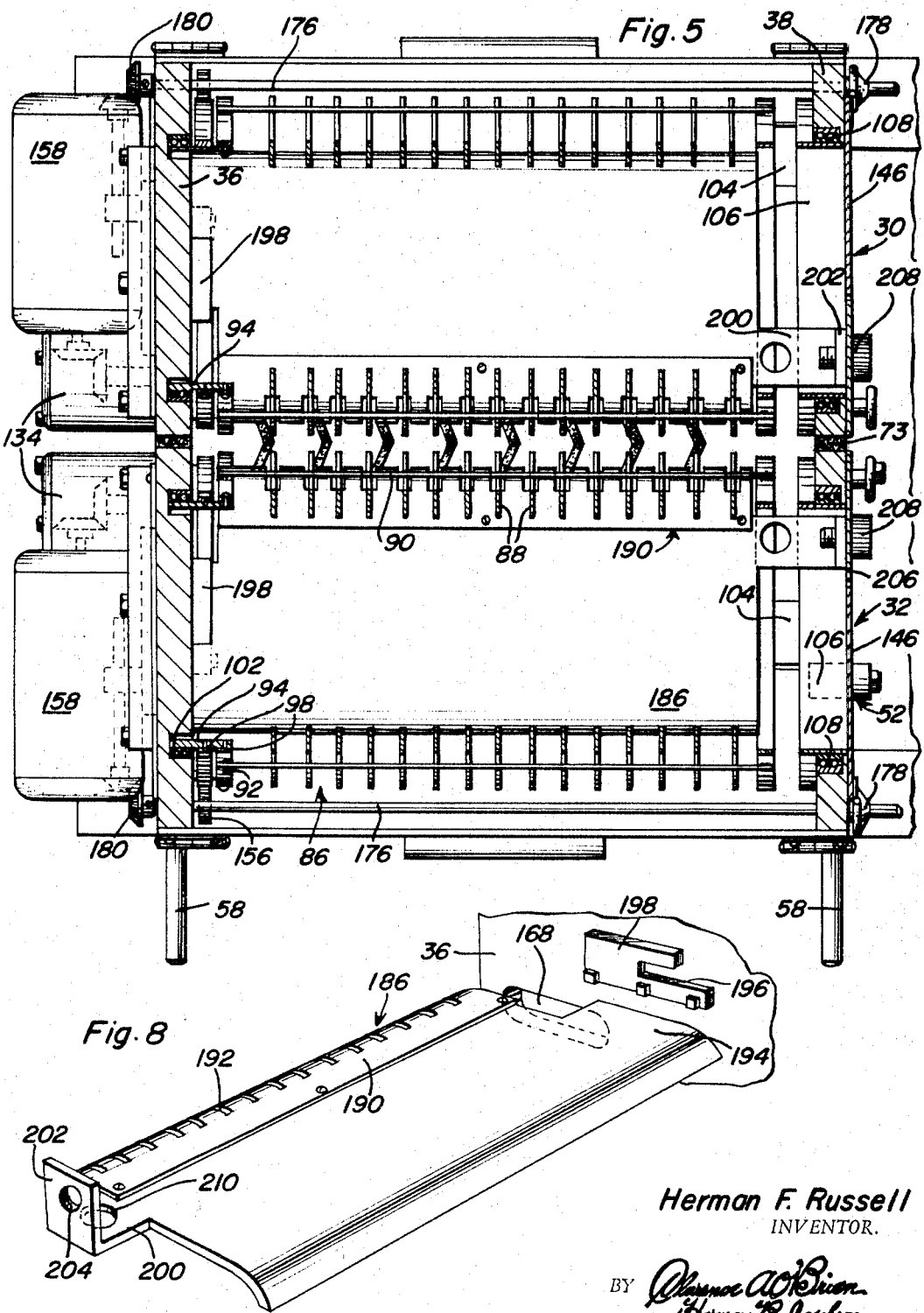

April 22, 1969 H. F. RUSSELL 3,439,369
MEAT CLEANING APPARATUS
Filed Jan. 15, 1968 Sheet 6 of 11

Herman F. Russell
INVENTOR.

BY *Clarence A. O'Brien*
*and Harvey B. Jacobson*
Attorneys

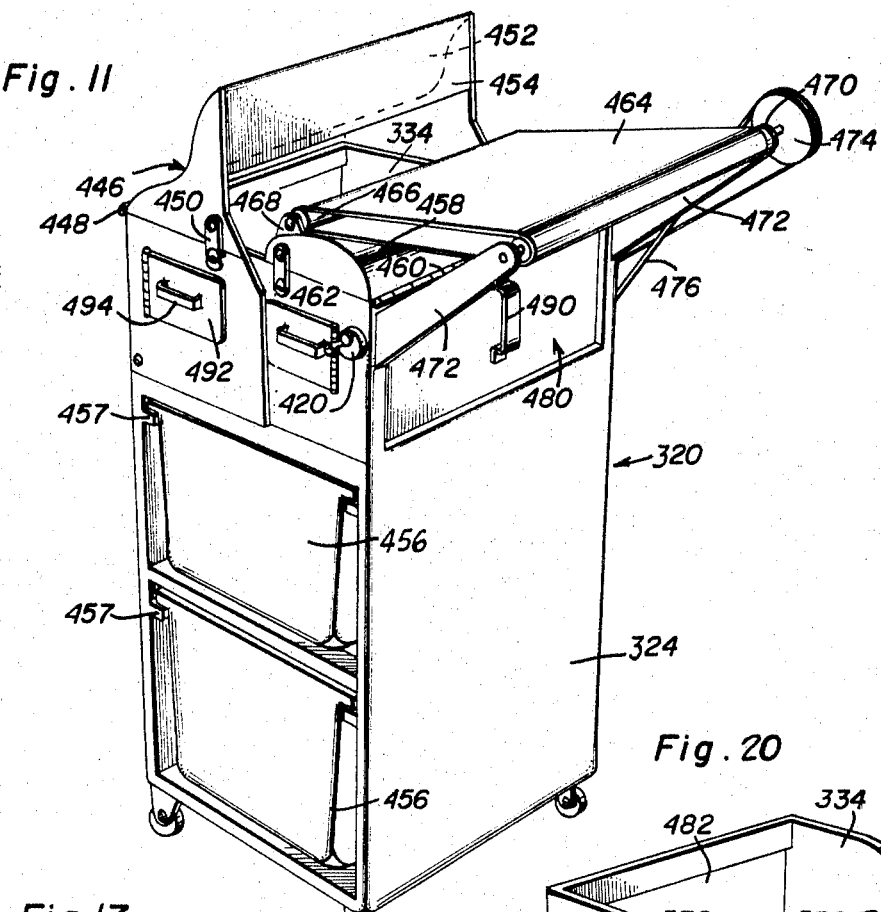
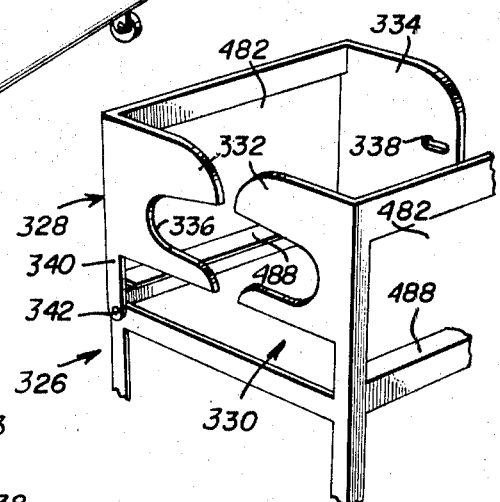
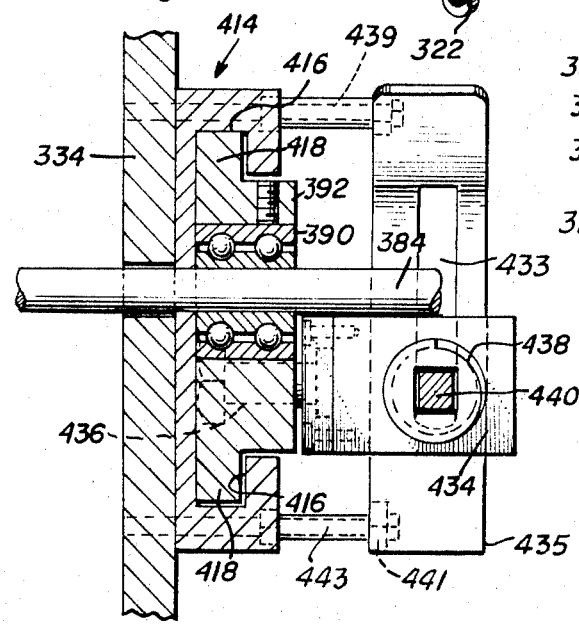
Fig. 11
Fig. 20
Fig. 17
Herman F. Russell
INVENTOR.

April 22, 1969    H. F. RUSSELL    3,439,369
MEAT CLEANING APPARATUS
Filed Jan. 15, 1968    Sheet 8 of 11

Herman F. Russell
INVENTOR.

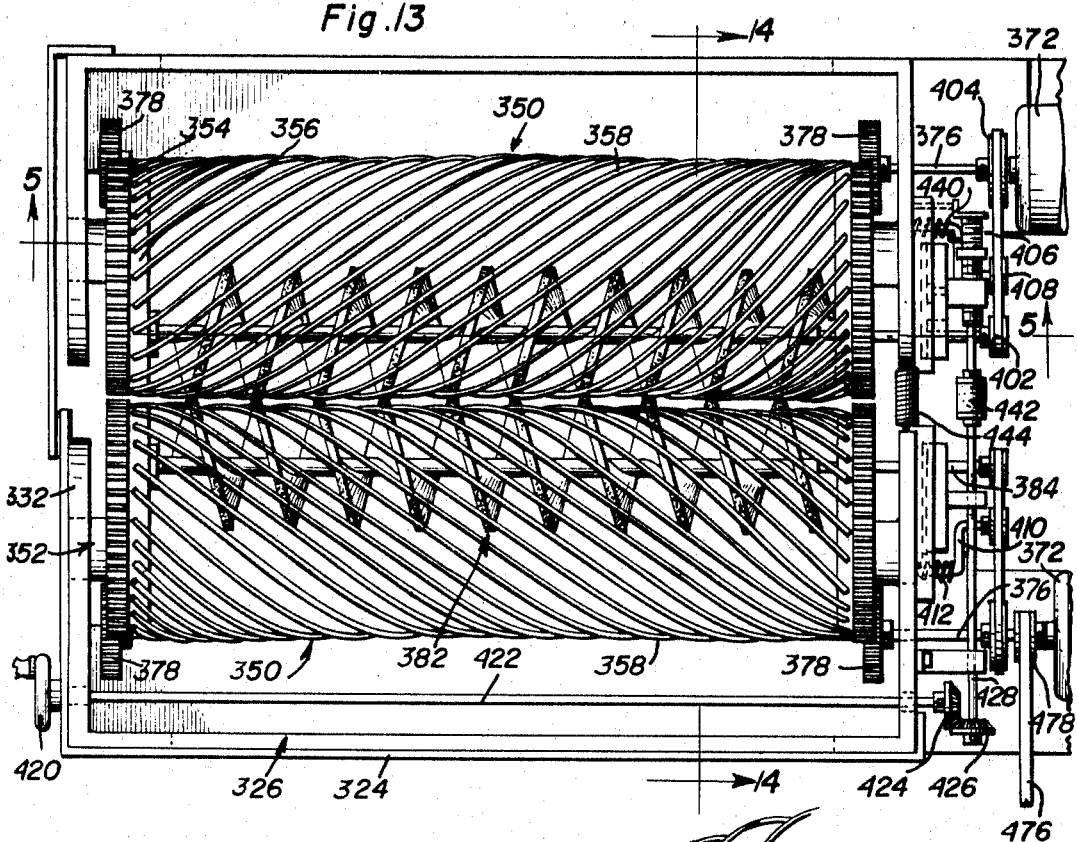
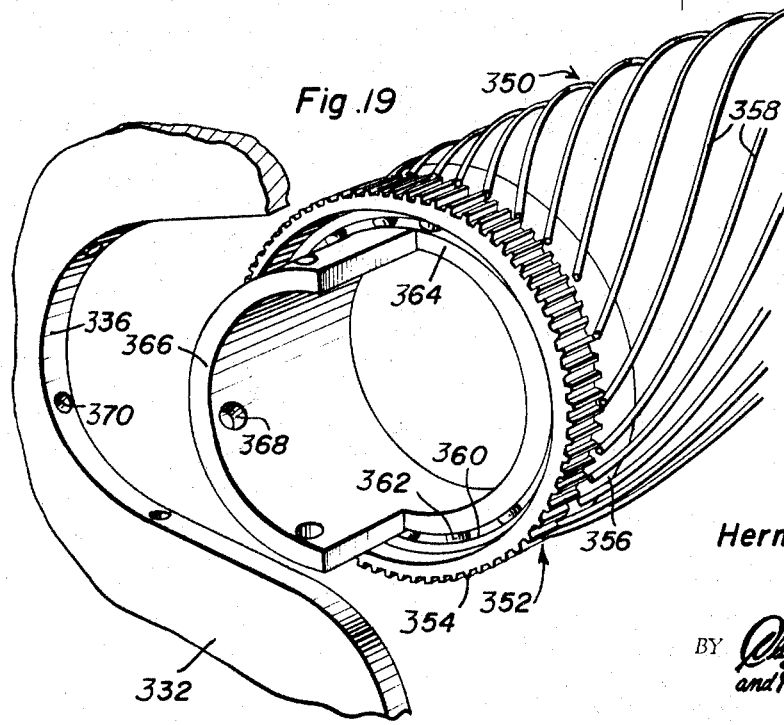

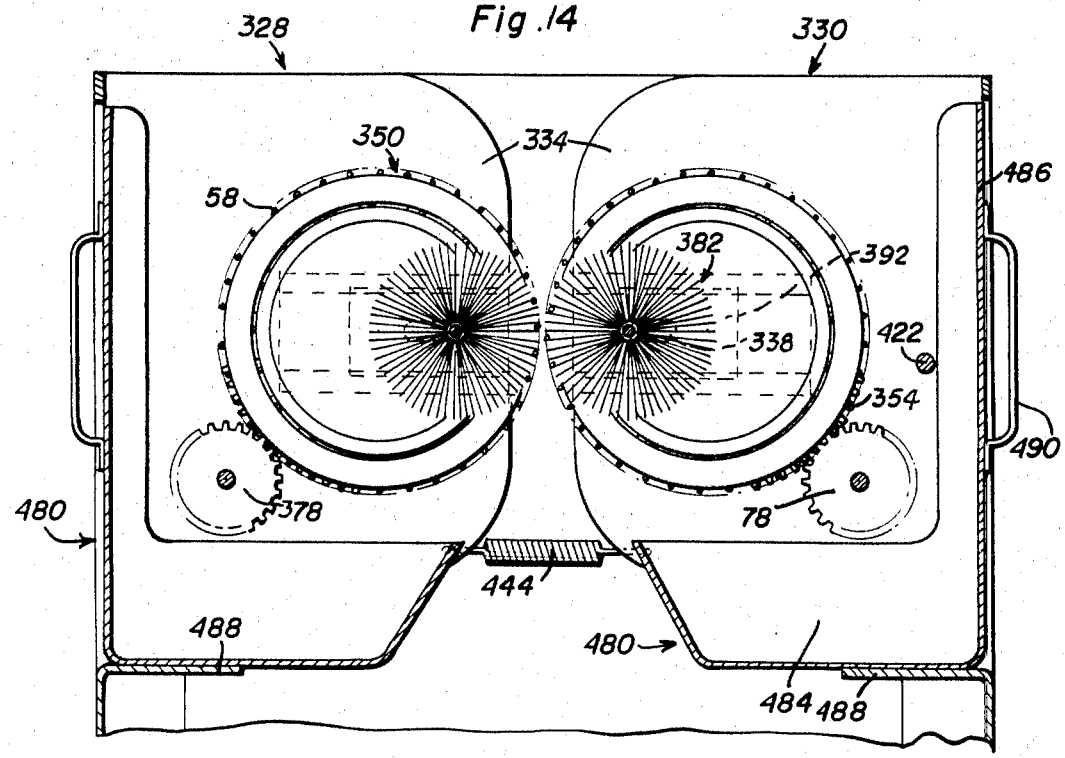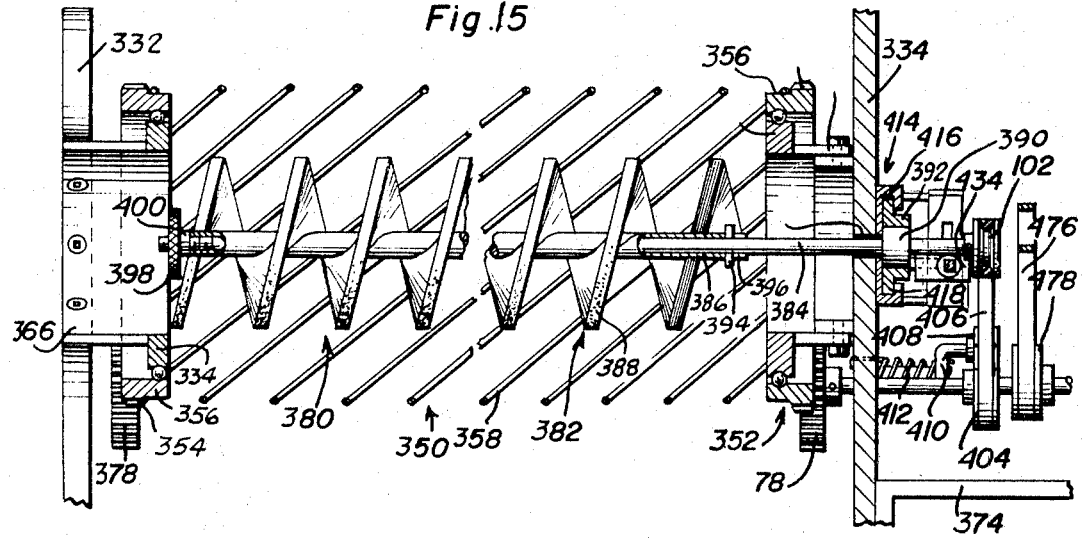

April 22, 1969 H. F. RUSSELL 3,439,369
MEAT CLEANING APPARATUS
Filed Jan. 15, 1968

Herman F. Russell
INVENTOR.

United States Patent Office 3,439,369
Patented Apr. 22, 1969

3,439,369
MEAT CLEANING APPARATUS
Herman F. Russell, 13900 Cherrylawn St.,
Detroit, Mich. 48238
Continuation-in-part of application Ser. No. 659,397,
Aug. 9, 1967. This application Jan. 15, 1968, Ser.
No. 704,971
Int. Cl. A22b 17/00; B08b 1/02; A46b 13/02
U.S. Cl. 15—3.17                                    41 Claims

ABSTRACT OF THE DISCLOSURE

A meat cleaning machine which incorporates a pair of horizontally oriented oppositely rotating wire-like gripping rollers which vertically move a cut of meat therebetween with the meat, during the vertical movement thereof, being cleaned by means of a pair of oppositely rotating brushes located within and operatively engaging the meat through the gripping rollers. Each of the brushes is mounted for lateral adjustment so as to vary the amount of projection through the corresponding wire-like gripping roller. One of the gripping rollers, and the associated brush, is resiliently biased toward the other gripping roller and brush so as to accommodate cuts of meat of various thicknesses while maintaining a positive grip thereon.

---

This is a continuation-in-part of application Ser. No. 570,616, filed Aug. 5, 1966, and now abandoned, for Automatic Meat Cleaning Machine With Meat Handling Rollers, a continuation-in-part of application Ser. No. 583,206, filed Sept. 30, 1966, now Patent No. 3,389,414, for Automatic Meat Handling and Cleaning Machine, and a continuation-in-part of application Ser. No. 659,397, filed Aug. 9, 1967, and now abandoned, for Automatic Meat Cleaning Machine.

The instant invention relates to new and useful improvements in devices for cleaning cuts of meat, and is more specifically concerned with a machine which, upon the introduction of a cut or slab of meat thereinto, will automatically clean the opposed surfaces of the meat so as to present a clean product suitable for sale and use.

It is a primary object of the instant invention to provide a meat cleaning device which will automatically and effectively remove bone dust, marrow, meat particles and the like, from both faces of a cut of meat so as to present a clean saleable product.

It is a significant object of the instant invention to provide an automatic meat cleaning machine which is capable of receiving cuts of meat of various thicknesses and effectively cleaning the opposed faces of the cuts of meat in a manner so as to enable the accommodation of a large volume of meat supplied in a substantially continuous flow.

In conjunction with the handling of a large volume of meat, it is an important object of the instant invention to provide means whereby a substantially automatic positioning of introduced meat is effected with the positioned meat being automatically moved at a predetermined rate along a predetermined path for engagement against power rotating cleaning brushes or the like.

Further, it is a significant object of this invention to provide a meat cleaning device which is automatically adjustable so as to accommodate itself to different thickness of cuts of meat with the cuts of meat, regardless of the thickness thereof, being positively gripped and moved past cleaning elements in a manner which insures a complete cleaning of the opposed faces or surfaces thereof.

Furthermore, it is a significant object of the instant invention to provide a meat cleaning device which is so constructed and so operates as to constitute an important and efficiently operating addition to all operations wherein meat is cut for subsequent sale and/or use, the machine standing at a height so as to position its upper receiving end generally level with the top of a conventional meat cutting saw adjacent which it is to be positioned. Thus, the mean can be quickly taken from a saw table and introduced into the machine with little effort on the part of the saw operator.

In addition, it is an important object of the instant invention to provide an automatic meat handling and cleaning machine which is relatively simple in both construction and operation, thereby making it easily maintained and capable of substantially trouble-free operation over extended periods of use.

Basically, the machine of the instant invention includes a pair of horizontal oppositely rotating open network gripping rollers or cylinders of wire-like or thin shape-sustaining members which receive and vertically move a cut of meat. Mounted within each of the rollers is an oppositely rotating brush selectively adjustable so as to vary the amount of projection of the bristles of the brush through the gripping roller for engagement with the meat being moved by the gripping rollers. One of the gripping rollers and the corresponding brush are mounted within a laterally pivoting or sliding housing section which is biased so as to resiliently resist movement and which is capable of automatically moving laterally so as to accommodate cuts of meat of varying thicknesses. Located beneath the gripping rollers or cylinders is a pair of lugs for the reception of the cleaned meat. Also beneath the gripping rollers, and laterally of the path of movement of the meat cuts, are a pair of scrap trays which receive the scraps brushed from the surfaces of the meat. The actual guiding of the meat into the machine is effected through the utilization of either the exposed upper surface of one of the gripping rollers as a meat conveying surface, or a separate endless conveyor discharging between the rollers, as well as through the provision of a vertical backstop located substantially vertically above the space between the gripping rollers. The gripping rollers are to be made of a series of wires or thin members arranged so as to both produce an effective grip on the meat and expose a major portion of the received brushes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the machine of the instant invention;

FIGURE 2 is a rear elevational view of the machine with the motor shields or guards partially removed;

FIGURE 3 is an enlarged parial cross-sectional view taken substantially on a plane passing along line 3—3 in FIGURE 1;

FIGURE 5 is a cross-sectional view taken substantially on a plane passing along line 5—5 in FIGURE 4 with the motor guards removed;

FIGURE 6 is a perspective detailed view of the mount for the movable section;

FIGURE 7 is a cross-sectional detail taken substantially on a plane passing along line 7—7 in FIGURE 3;

FIGURE 8 is a perspective detail of the splash guard or deflector;

FIGURE 9 is a cross-sectional detail of the brush retaining means;

FIGURE 11 is a perspective view of a modified form of the automatic meat cleaning machine comprising the instant invention;

FIGURE 13 is an enlarged top plan view of the machine with the top covering elements removed so as to expose the gripping cylinders and cleaning brushes;

FIGURE 14 is an enlarged transverse cross-sectional view taken substantially upon a plane passing along line 14—14 in FIGURE 13;

FIGURE 15 is an enlarged cross-sectional view taken substantially on a plane passing along line 15—15 of FIGURE 13;

FIGURE 17 is an enlarged cross-sectional view illustrating details of the brush mounting and adjusting means associated with the movable section of the cleaning machine;

FIGURE 19 is an enlarged perspective detail of an end of one of the rotatably mounted gripping cylinders, illustrating both the construction thereof and the manner in which it is mounted;

FIGURE 20 is a partial perspective detail of the structural framework of the machine;

Figure 4:
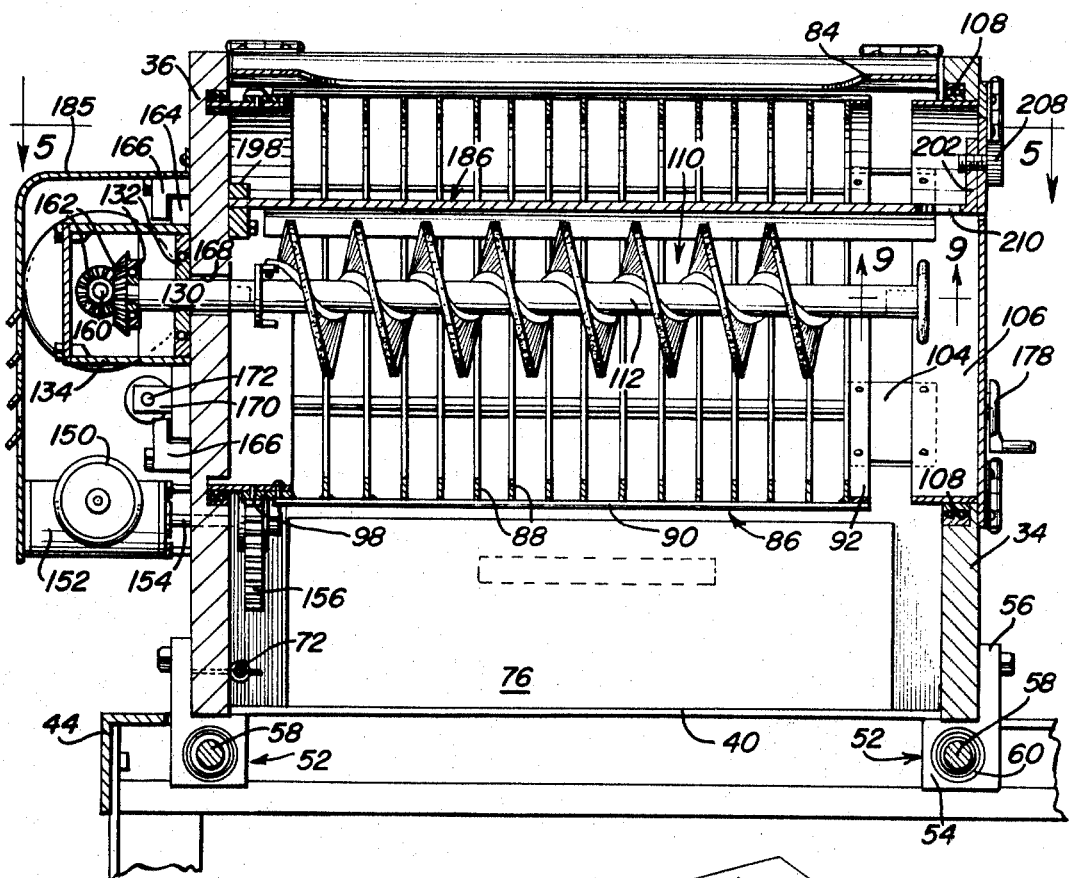
FIGURE 4 is a partial cross-sectional view taken substantially on a plane passing along line 4—4 in FIGURE 3.

Referring now more specifically to the drawings, and in particular FIGURES 1 through 10, reference numeral 20 is used to generally designate the automatic meat cleaning machine comprising the instant invention. The machine 20 is to be vertically orientated with the upper receiving end thereof at a height approximating the height of a conventional meat saw table whereby each cu t of meat can be, with a minimum amount of effort, removed from the saw table and deposited into the cleaning machine.

The machine 20 includes a table-like stand 22 having upper and lower pairs of opposed guide rails 24 which slidably mount upper and lower meat receiving lugs 26 introducible in meat receiving position within the stand 22 through the open front of the stand 22 as will be best appreciated from FIGURES 1 and 6. The lugs 26 actually include peripheral outwardly directed flanges which ride on the appropriate rails 24. In use, after the top lug 26 is filled, it can merely be slid out and emptied while the cleaning operation proceeds with the cleaned cuts of meat dropping into the lower lug 26. When the lower lug 26 is filled, the empty upper lug 26 is reinserted and used while the lower lug is being emptied.

The actual cleaning operation is effected by a cleaning unit 28 mounted on the stand 22 and comprising a fixed section 30 and a movable section 32. Each of the sections 30 and 32 includes a front wall 34, rear wall 36, and outer side wall 38, defining a laterally inwardly opening chamber.

The fixed section 30 includes a floor or bottom panel 40 which is rigidly affixed to the stand 22 between the front and rear top beams 42 and 44 thereof adjacent a first side beam 46. The walls 34 and 36 of the fixed unit 30 are in turn rigidly affixed to the bottom panel 40 as well as the coplanar portion of the adjacent side beam 46. The bottom panel 40 is of a width less than that of the corresponding front and rear panels 34 and 36 with the lateral inner edge 48 of the bottom panel terminating outwardly of the inner end of the unit 30 so as to, in conjunction with similar structure present on the movable section 32, provide a vertical slot for the passage of the cleaned meat therethrough into the subjacent lug or lugs 26.

The movable section 32 also includes a floor or bottom panel 50, this bottom panel 50 extending between and being rigidly affixed to both the front and rear panels 34 and 36 of the movable section 32 independent of the supporting stand 22. This floor panel 50 extends laterally from the corresponding outer wall 38 to a point laterally outward of the open inner side of the movable section 32 so as to complement the outwardly spaced inner edge of the bottom panel 40 of the fixed section 30 in defining the meat accommodating slot between the sections 30 and 32.

The movable or adjustable section 32 is mounted for lateral sliding movement relative to the fixed section 30 on the stand 22 by means of four supports or mounts 52. Each of these mounts includes a horizontal leg 54 which underlies the bottom panel 50 and is bolted or otherwise affixed thereto, and a vertical leg 56 which lies against, depending on the particular support 52, either the front or rear wall 34 or 36 to which it is also rigidly affixed as by bolting. These supports 52, two normally being secured to each of the front and rear walls 34 and 36, are in turn slidably mounted on a pair of elongated shafts 58, through appropriate bearing units 60, for a lateral sliding adjustment of the adjustable section 32. These rods 58, located adjacent the front and rear of the stand 22, have the lateral inner ends 62 each fixed within a mounting block 64 rigid with the fixed bottom panel 40, FIGURE 3 illustrating one manner of effecting this through the utilization of a mounting angle 66 bolted or otherwise affixed to the undersurface of the fixed bottom panel 40. The outer ends of the rod-like shafts 58 are received through and affixed to the second side beam 68 of the stand 22. Further, if deemed necessary, a front-to-rear bracing beam 70 can be provided laterally between each pair of supports 52 in a manner so as to provide additional support for the sliding or adjustable section 32 without interfering with the desired range of movement. Incidently, it will of course be appreciated that the shafts 58 are received through and also rigidified by the bracing beam 70.

The movable section 32 is biased laterally inward toward the fixed unit 30 in a manner which, while resisting such movement, allows an outward movement of the movable section 32 relative to the fixed section 30 and a subsequent return of the movable section 32, thereby accommodating cuts of meat of varying thicknesses as shall be described subsequently. This inward biasing of the movable section 32 can, as illustrated in FIGURE 3, be effected by an elongated coiled tension spring or springs 72 fixed between either the front or rear walls of the two sections 30 and 32. This inward biasing may also be effected by means of cable suspended weights entrained over pulleys, or by hydraulic closure units. Further, if desired, resilient bumpers 73 can be mounted on the inner edges of the fixed section walls 34 and 36 so as to cushion the closing movement of the movable section 32.

The outer side wall 38 of each of the sections 30 and 32 includes a hingedly mounted full width lower panel 74 which pivots upwardly and outwardly so as to expose the lower portion of the internal section chamber for the introduction of a scrap tray 76 which receives the bone dust, marrow, meat particles and the like as they are scraped from the opposed faces of a cut of meat being cleaned. A suitable stop means can be provided to properly position the scrap tray 76.

The movable or adjustable section 32 includes a generally vertical backstop or meat positioning panel 78 adjacent the inner side thereof and inclined upwardly and outwardly at a slight angle whereby a cut of meat, engaged thereagainst, will slide vertically therefrom between the sections 30 and 32. This backstop or panel 78 is removably mounted within a pair of generally vertical slots 80 provided in the opposed inner faces of the front and rear panels 34 and 36 of the movable unit 32, these slots 80 being of a height sufficient to provide a stable mounting of the backstop 78 so as to form a rigid upwardly projecting abutment which will in effect "catch" and position a slab or cut of meat flung thereagainst. Outward of the backstop 78, the movable section 32 is provided with a hinged top panel 82 which pivots upwardly and outwardly so as to expose the interior of the section 32, this top panel 82 being flat and, through either a resting engagement with the upper edges of the front and rear panels 34 and 36 or the construction of the mounting hinges, assuming a stable horizontal position when closed. The fixed section 30 is also provided with a hingedly mounted top panel 84. However, this top panel 84 mounts between the front and rear walls 34 and 36 and, when closed, assumes a generally arcuate configuration corresponding to the curvature of a meat gripping roller or cylinder 86 mounted within the chamber immediately therebelow. The top panel 84, as will be best appreciated from FIGURE 1, in effect consists of two inwardly projecting arcuate arms which overlie the opposite end portions of the subjacent meat gripping roller 86 with the entire central portion of the roller 86 being exposed so as to receive and inwardly convey cuts of meat dropped thereon as shall be gone into in more detail subsequently. The top panel 84, when closed, assumes the position illustrated in FIGURE 3, and when open pivots upwardly and outwardly therefrom as generally suggested in phantom lines in FIGURE 1.

The cylindrical meat gripping roller or cylinder 86, as well as a substantial duplicate thereof mounted within the movable section 32 and also indicated by reference numeral 86, consist of a plurality of concentric wire-like rings or annular blades 88 laterally spaced from each other and interconnected by a plurality of longitudinally extending rigid wire-like rods 90 spaced peripherally about the aligned rings 88. The meat gripping rollers 86 are to extend for generally the full depth of the corresponding sections 30 and 32 and are located with the inner peripheries of the wire-like rings 88 in slightly spaced relation to each other at the innermost position of the movable section 32. Each of the rings 88, which, as will be apparent from the drawings, can have a flat configuration to define in effect a blade, is to have a serrated outer periphery with the gripping teeth defined thereon being inwardly and downwardly directed at the inner sides of the sections 30 and 32 whereby, upon a rotation of the rollers or cylinders 86 in opposite directions so as to effect a downward movement of a received cut of meat between the sections 30 and 32, a positive grip on the cut of meat will be effected. It is contemplated that at least four of the longitudinally extending rigid connecting rods 90 be used, these rods overlying and being welded or otherwise rigidly affixed to the outer periphery of the aligned rings 88, and at the same time being sufficiently thin so as to not interfere with the gripping function of the rings.

The rear and forward ends of the wire-like rigid rods 90 project beyond the endmost gripping wire-like rings 88 and are welded to the outer periphery of a pair of flat annular mounting collars 92. The rear mounting collar 92 is telescopically received over the forward end of a hollow cylindrical mounting sleeve 94 and releasably bolted thereto by appropriate bolt means 96. Rigidly affixed to the sleeve 94 rearward of the mounting collar 92 is a ring gear 98 with the rearmost end of the sleeve 94 itself being received within an annular groove 100 provided in the corresponding rear wall 36 and rotatably secured therein by an appropriate annular or ring-like bearing unit 102.

The front or forward mounting collar 92 has a series of extension plates 104 secured at peripherally spaced points thereabout and projecting longitudinally therefrom for engagement with a front mounting sleeve 106 which is in turn rotatably mounted within an annular opening provided in the corresponding front wall 34 by a ring-like roller bearing unit 108 similar to the roller bearing unit 102. Mounted in this manner, it will be appreciated that each of the meat gripping rollers 86 can be quickly and simply removed for cleaning or other maintenance through merely a release of the extension plates 104 from the forward mounting collar 92 and a release of the bolts 96 utilized in mounting the rear mounting collar 92, after which the individual roller 86 can be shifted forwardly off of the rear sleeve 94 and lifted vertically from the corresponding cleaning section.

While one particular type of meat gripping roller 86 has been described in detail, it should be appreciated that various other types of gripping rollers formed of an open network of wirelike members can be utilized, such members preferably being of stainless steel and either cylindrical rod-type or flat blade-type as illustrated.

Positioned longitudinally through each of the meat gripping rollers or cylinders 86 is a meat cleaning brush 110. These brushes 110 are orientated in a manner whereby the longitudinal periphery thereof projects laterally outward of the corresponding roller 86 at the vertical center of the machine for engagement with vertically moving cuts of meat. The brushes 110 are located at or slightly below the horizontal center of the gripping rollers 86 with the gripping rollers 86 having the wire-like elements thereof so spaced as to allow for a projection therethrough of a substantial portion of the brushes 110 while at the same time providing for a positive grip on the cuts of meat. Each brush 110 preferably includes an elongated hollow mounting shaft 112 about which the brush bristles 114 are spirally wound for at least the full length of the corresponding gripping roller 86. In the illustrated embodiment, it is contemplated that the bristles 114 actually be mounted on a spiral backing strip 116 which removably slides into position over the mounting shaft 112 and has at least one projecting end portion 118 thereof locked to the shaft 112 as detailed in FIGURE 10. This locking of the strip end 118 can be effected through an engagement of the end within an aperture 120 in an inwardly directed flange 122 on a disc or washer 124 welded to the shaft 112 adjacent the end thereof. The strip 116, or at least the end portion 118 thereof, will be resilient and require a slight outward flexing for engagement within the aperture 120, thereby providing for a positive retention of the bristle mounting strip 116 until manually disengaged.

The rear end of the brush mounting shaft 112 is internally threaded as at 126 and receives an externally threaded stub 128 on a drive shaft 130. The drive shaft 130, noting FIGURE 4, extends through the rear wall 36 and is supported by a pair of longitudinally spaced bearing units 132 mounted within a gear box 134 which is in turn mounted on the rear face of the rear wall 36. The front end of the brush mounting shaft 112, noting FIGURE 9, mounts a removable bristle retaining cap 136. This cap 136, in addition to an enlarged disc-like retaining head 138, includes a hollow projecting cylindrical portion 140 which is telescopically received within the end of the shaft 112 and which internally mounts a flexible spring clip 142 for releasable engagement within opposed recesses 144 internally within the shaft end. This clip 142 actually consists of two integrally connected generally parallel legs having outwardly bowed portions which extend through the walls of the member 140 and project outwardly therebeyond for engagement within the shaft recesses 144 upon an initial inward compressing of the bowed portions so as to move into the shaft 112 itself. The brushes 110 of course rotate both in opposite directions from each other and in opposite directions from the corresponding meat gripping rollers 86 so as to produce, in the central plane between the sections 30 and 32, an upward brushing engagement with a downwardly moving cut of meat. Incidentally, inasmuch as the bristles 114 project through the rollers 86, the connecting rods 90 periodically come in contact with the bristles so as to produce a cleaning of the bristles.

In order to provide for a removal of the brushes without disturbing the meat gripping rollers 86, each of the front walls 34 is provided with an enlarged access panel 146 hingedly secured thereto for outward pivotal opening, such panels 146 being retained closed by any suitable clip means 148. When open, it will of course be appreciated that each of the panels 146 exposes the upper interior of the corresponding section chamber through the enlarged opening within which the roller mounting sleeve 106 is mounted by the associated bearing unit 108.

Each of the oppositely rotating wire-like meat gripping rollers 86 is to be preferably individually driven. As such, a motor 150 is mounted on the rear face of each rear panel 36 and, through an appropriate gear box 152 and a drive shaft 154 along with a drive gear 156 thereon, drives the corresponding meat gripping roller 86. As will be appreciated from FIGURE 4, the gear unit drive shaft 154 extends through the rear wall 36 and the internally mounted drive gear 156 meshes with the gear ring 98 affixed to the rear sleeve 94. In this manner, a direct driving of the corresponding roller 86 is effected. Incidentally, if so desired, the front mounting sleeve 106 can also be provided with a ring gear thereon and the shaft 154 extended across the full depth of the coresponding section so as to directly drive both ends of the roller 86, this also of course requiring the use of a front drive gear similar to the gear 156.

It is contemplated that each of the oppositely rotating brushes 110 is also to be individually driven, utilizing a separate motor 158 having a projecting drive shaft 160 which projects therefrom and, through a pair of meshing bevel gears 162, drives the corresponding brush drive shaft 130 and hence effects the rotational driving of the corresponding brush 110.

It is contemplated that the brushes 110 be laterally adjustable so as to vary the degree of projection of the bristles through the rollers 86, and hence vary the brushing engagement with the meat. Accordingly, each brush motor 158 and its related gear box 134 is mounted on a mounting or support block 164 which in turn is supported between upper and lower guide tracks 166 extending laterally across the rear surface of the rear wall 36 of each section 30 and 32. These tracks 166, noting FIGURE 4, are rigidly affixed to the corresponding rear wall 36 and overlie the block 164 in a manner so as to retain the block 164 for lateral sliding movement. In order to accommodate this lateral adjustment of each of the brushes 110, it will be appreciated that the aperture through the corresponding rear wall 36 which receives the brush drive shaft 130 is in fact in the nature of an elongated slot 168, note FIGURES 3 and 8. In order to effect the desired lateral adjustment, a transversely apertured lug 170 projects rearwardly from each of the mounting blocks 164, this apertured lug 170 being internally threaded and receiving an elongated threaded rod 172 therein. The outer end portion of the rod 172 is rotatably locked within a smooth bore in the lug 174 fixed to the rear wall 36 of the corresponding section in a manner whereby, upon a rotation of the rod 172, a longitudinal traveling of the lug 170, and hence the mounting block 164, along the rod 172 will be effected. This in turn will result in lateral adjustment of the corresponding brush 110. The rotation of the rod 172 is effected by means of a control shaft 176 projecting at right angles from the extreme outer end of the shaft 172 and extending through bearing supports within the corresponding rear and front walls 36 and 34, terminating in a forward end mounting an enlarged control handle 178 at the front of the machine. The rear end of the control shaft 176 mounts a bevel gear 180 which meshes with a similar gear 182 on the rod 172 whereby, upon a rotational manipulation of the handle 178, a rotational driving of the shaft 172 is effected and a lateral adjustment of the brush unit results. It will of course be appreciated that the mounting of the threaded rod 172 within the smooth bores lug 174 is such so as to, while allowing for a rotation of the rod 172, prevent any longitudinal movement thereof. A suitable control panel 184 will preferably be mounted on the front wall 34 of the fixed section 30 for effecting a starting and stopping of both the roller and brush motors in a synchronized manner.

With reference to FIGURE 4, it is contemplated that a motor protecting louvered housing or shield 185 be mounted on each rear wall 36 and generally enclose the associated motors and gear boxes.

With reference to FIGURE 3, it will be noted that a splash guard or deflector 186 has been associated with each roller and brush combination. This splash guard 186 extends within the corresponding meat gripping roller 86 for the full length thereof in spaced overlying relation to the associated brush 110 in a manner whereby any particles brushed from the downwardly moving cut of meat will be received and deflected downwardly for reception within the corresponding scrap tray 76. The splash guard 186 consists basically of a relatively wide flat plate having the outer edge portion 188 thereof curved generally downwardly. Mounted along the inner edge of each of the deflector plates is an elongated flexible strip 190 which includes a series of slots 192 therein, each receiving one of the wire-like gripping rings 88 so as to effect a continuous cleaning of the rings 88, thus leaving the gripping teeth thereon in a condition capable of effecting a positive grip on the cut of meat. By the same token, by extending between the adjacent rings 88, this edge strip 190 also acts so as to prevent any possibility of scraps being discharged upwardly at this point.

In order to mount the splash or deflector 186, each is provided, at the rear end thereof, with a longitudinally projecting flange-like portion 194 which slides horizontally into a slot 196 defined within a mounting bracket 198 affixed to the inner face of the corresponding rear wall 36. The front end of each of the deflector plates includes a longitudinally projecting flanged portion 200 terminating in a vertical lug 202 having an internally threaded bore 204 therethrough. This lug 202 engages against a portion 206 of the front wall 34 and is locked thereto by a suitable hand-manipulable bolt 208. In this manner, it will be appreciated that the splash guard 186 can be quickly removed for cleaning or the like through merely a removal of the bolt 208 and a withdrawal of the rear end flange 194 from the bracket slot 196, this removal being facilitated, if necessary, by a fingerhole 210 provided in the forwardly projecting front flange 200. Incidentally, with reference to FIGURE 1, it will be noted that the front wall portion 206 which mounts the front end of the splash guard 186 must necessarily occur at what would normally be the upper inner corner of the front access panel 146. Accordingly, the access panel 146 is suitably notched so as to accommodate this portion 208 with the portion 208 being outwardly offset from the main front wall 34 so as to cooperate with the access panel 146 in presenting the appearance of a rectangular panel.

With reference to FIGURES 1 and 2, it will be noted that a guard rail 212 will preferably be mounted on the forward portion of the machine 20 in a manner so as to generally confine the adjustable or movable section 32. As such, the guard rail 212 has one end 214 thereof bolted to the top edge of the front wall 34 of the fixed section 30 and the second end portion 216 thereof affixed to the adjoining side of the stand 22, the guard rail 212, between the secured ends thereof, projecting laterally outward in a generally rectangular configuration above the movable section 32 and to a point just outward of the outer limit thereof. Incidently, the guard rail 212 is so bent as to not interfere with the opening of the top panel 82 of the movable section 32.

In actual use, the machine 20 of the instant invention will normally be positioned adjacent the discharge end of a conventional meat saw whereby the user can remove each cut of meat and with substantially no additional effort, introduce it into the meat cleaning machine 20. When smaller cuts of meat are involved, they may be dropped directly upon the exposed upper portion of the gripping roller 86 associated with the fixed section 30 with this roller carrying the meat inwardly and downwardly for grasping engagement by the movable section roller 86 with the two rollers 86 cooperating so as to move the cut of meat slowly vertically downward past the upwardly brushing brushes 110 for a subsequent discharge into the subjacent lug 26. Larger cuts of meat, on the contrary, will normally be swung away from the meat saw into engagement with the backstop 78 which automatically positions the cut of meat vertically, the cut of meat sliding therefrom along the vertical centerline of the sections 30 and 32 for gripping by the rollers 86. The positioning of the backstop is deemed particularly significant in high speed operations in that very little accuracy and substantially no waste of time is required in properly positioning the meat for engagement by the gripping members 86. In light of the manner in which the section 32 is mounted for lateral adjustment relative to the section 30, it will be appreciated that cuts of meat of varying thicknesses can be accommodated with the section 32 merely adjusting outward in an automatic manner against the resilient resistance of means such as spring 72 which ensures the maintenance of a positive grip on the meat between the two rollers 86. The opposed oppositely rotating brushes 110 are normally positioned slightly below the centerline of the rollers 86 so as to enable a positive grip on the cut of meat prior to an engagement therewith by the brushes. The actual degree of engagement of the brushes 110 with the cut of meat can be adjusted through a lateral adjustment of the brushes which varies the amount of projection of the cleaning bristles outwardly beyond the gripping rollers. After the individual cuts of meat have been moved downwardly past the cleaning brushes 110, the meat is automatically discharged vertically between the sections into the subjacent collecting lugs, the scrap removed by the brushes being deflected into scrap trays which are removable through the opposed sides of the machine 20 for emptying.

At this point attention is specifically directed to FIGURES 10A through 10D which illustrate an alternate manner of mounting the cylinder or roller herein referred to by reference numeral 220. The cylinder 220 includes annular collars 222 and 224 at the inner and outer ends thereof juxtaposed the rear and front wall portions 226 and 228. The rear annular collar 222 includes a continuous inwardly directed circular flange 230 which has a series of keyhole slots 232 formed therein. A bearing unit 234 is mounted within the rear wall portion 226 and includes an inwardly projecting mounting collar 236 which in turn incorporates a series of inwardly projecting headed studs 238 for reception within selected ones of the keyhole slots 232. The outer periphery of the mounting collar 236 incorporates a gear track 240 which in turn is meshed with and driven by the drive gear 242, this gear 242 being equivalent to the gear 156 which effects the driving of the cylinder 86. Thus, the mounting of the cylinder 220 involves only a longitudinal movement of the cylinder 220 so as to position the headed lugs 238 within selected ones of the keyhole slots 232, normally two lugs 238 being provided in conjunction with four slots 232 so as to facilitate the mounting of the cylinder 220. It will of course be appreciated that the keyhole slots 232 are so orientated as to maintain the headed lugs 238 seated in the narrow portions of the lug receiving slots during the rotational driving of the cylinder or roller 220.

In order to enable a mounting and removal of the cylinder or roller 220, the front wall portion 228 is to be in the nature of a hingedly mounted panel or door which opens the entire front of the section for free access to the cylinder 220.

Figure 10:
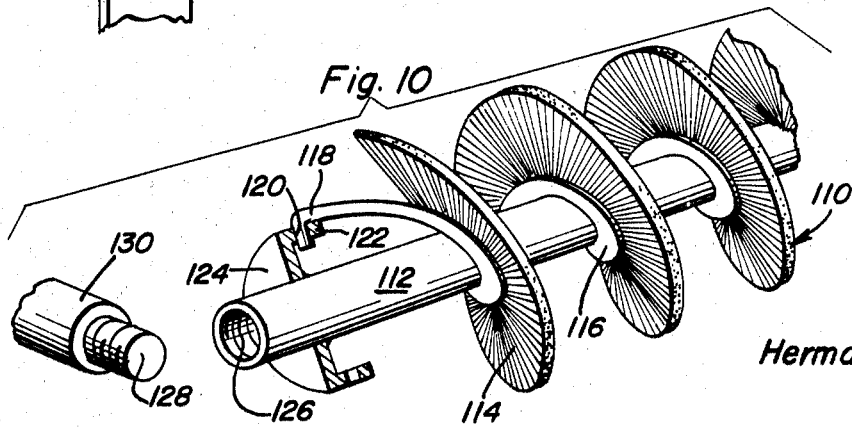
FIGURE 10 is a perspective detail of the mounting end of the brush.
Figure 10A:
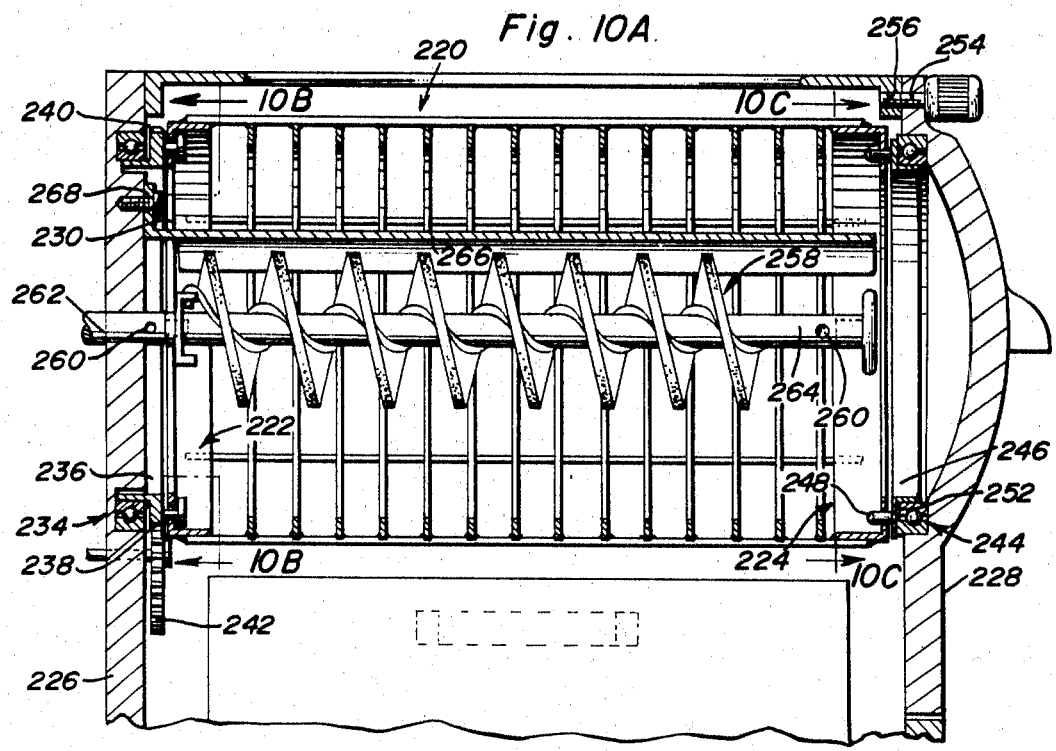
FIGURE 10A is a cross-sectional view similar to FIGURE 4 illustrating a modified form of cylinder and mount therefor.
Figure 10B:
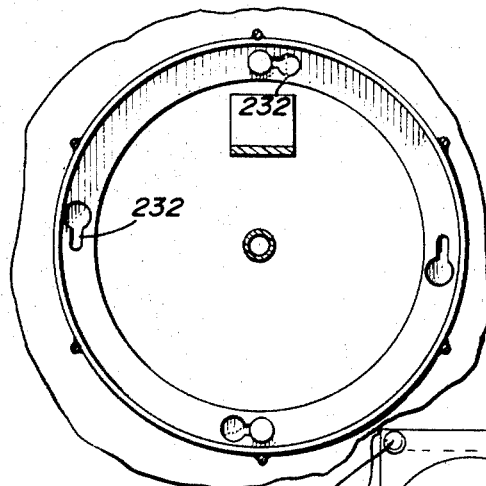
FIGURE 10B is a cross-sectional view taken substantially on a plane passing along line 10B—10B in FIGURE 10A.
Figure 10C:
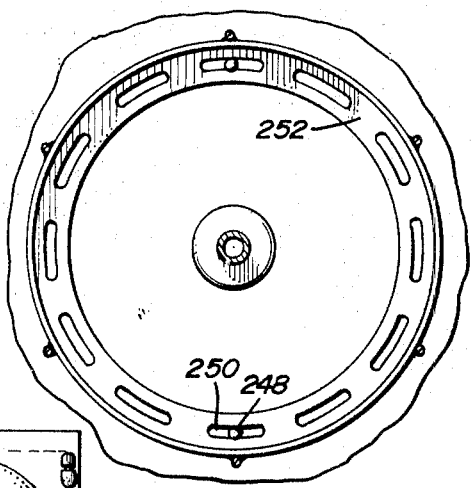
FIGURE 10C is a cross-sectional view taken substantially on a plane passing along line 10C—10C in FIGURE 10A.
Figure 10D:
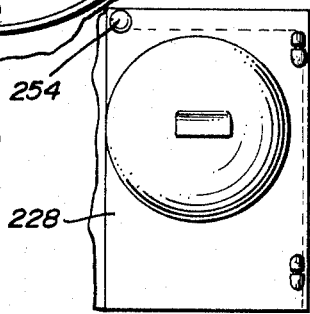
FIGURE 10D is a front elevational view of the access door to the cylinder of FIGURE 10A.

In order to rotatably mount the forward end of the roller or cylinder 220, it will be noted that a bearing unit 244, similar to the unit 234, is mounted within the inner face of the front wall portion or door panel 228, this bearing unit 244 including a mounting collar 246 which in turn incorporates a plurality, normally two, of straight mounting lugs or studs 248. These studs 248 will, upon a closing of the door panel 228, engage through a pair of opposed elongated stud receiving slots 250 through the circular inwardly projecting flange 252 on the roller collar 224. In this manner, the outer end of the cylinder or roller 220 is also rotatably mounted. With reference to FIGURE 10C it will be appreciated that not only are the slots 250 elongated, but several sets of slots are provided about the flange 252 so as to enable an engagement of the studs 248 regardless of the rotationally adjusted position of the roller 220 required to mount on the headed studs 238. With reference to FIGURES 10A and 10D, it will be noted that the door panel 228 can be releasably locked closed by a hand manipulatable bolt 254 extending through the upper free edge corner thereof and into threaded engagement with a bore 256 provided therefor on the frame of the meat cleaner. Thus, the mounting of the roller 220 will be completed by merely a closing and locking of the door panel 228. By the same token, when it becomes desirable to remove the roller 220, one need merely open the door panel 228, twist the roller 220, and withdraw the roller from the headed studs 238.

With reference to FIGURE 10A, it will be noted that the brush 258 will be constructed and mounted in the same manner as described supra in conjunction with the brush 110. The actual mounting and removal of this brush 258, or for that matter any similarly mounted brush, can, if so desired, be facilitated through the provision of wrench receiving holes 260 on both the drive shaft 262 to which the brush shaft is attached, and on the brush shaft 264 itself.

Finally, inasmuch as the entire front panel 228 is to be swung open so as to enable a removal of the roller 220, the splash deflector or guard 266 will necessarily be mounted in a manner other than that illustrated in FIGURE 4, for example, by bolting the guard 226, through an upstanding flange 268, directly to the rear wall portion 26 as suggested in FIGURE 10A.

Referring now specifically to FIGURES 11 through 20, reference numeral 320 is used to generally designate the embodiment of the machine appearing therein. This machine 320 is to be vertically orientated with the upper receiving end thereof likewise being at approximately the same height as the table of a conventional meat saw hereby each cut of meat can be quickly deposited in the machine 320 immediately subsequent to the cutting thereof. In addition, as noted in FIGURE 11, the machine 320 is to preferably mount on caster wheels 322 for mobility and include a smooth easily cleaned housing 324.

In order to support the various operating elements, a rigid internal framework 326 is provided. This framework 326 includes a pair of opposed upper sections 328 and 330, each of which in turn includes a pair of inwardly directed front walls 332 and a pair of inwardly directed rear walls 334, the walls of both pairs terminating in spaced relation to each other. Each of the front walls 332 includes an enlarged cylinder mounting recess 336 therein while each of the rear walls 334 includes a horizontally elongated adjusting slot 338 therein so as to accommodate an adjustment of the cleaning elements as shown and described subsequently. The section 328 is mounted for outward swinging or pivoting relative to the section 330 which is rigid with the frame. This outward swinging of section 328, provided for by pivotally mounting the depending legs 340 of the section 328 to the portion of the framework 326 immediately therebelow by pivot pins 342 or the like, is resiliently resisted by suitable spring means 344 engaged between one or both of the section legs 340 and the adjacent portion of the framework 326 inward thereof. In addition, in order to limit the inward swinging of the section 328 under the influence of the spring or springs 344, a suitable stop 346 is provided. This stop consists of an angle member having a vertically projecting leg including a suitable resilient bumper 348 or the like mounted thereon for engagement thereagainst by the inner edge of one or both of the section legs 340, this being best illustrated in FIGURE 12.

Rotatably mounted within each of the sections and extending transversely between the front and rear walls 332 and 334 is an elongated enlarged wire gripping roller or cylinder 350. These cylinders or rollers 350 are positioned in parallel opposed relation to each other and spaced slightly from each other in the innermost position of the pivotally mounted section 328.

The opposite ends of each of the rollers 350 are defined by rigid annular collars 352, each collar including a gear or gear face 354 defined about the outer portion thereof, with the inner portion being downwardly offset so as to define a mounting shoulder 356 for the individual wires 358 which make up the body of the roller 350. The inner periphery of the collar 352 defines an outer race 360 which operates in conjunction with suitable bearings 362 and an inner annular race 364 so as to provide for a substantially friction free rotatable mount for the corresponding cylinder or roller 350. Each of the annular inner race defining members 364 includes a laterally projecting mounting flange 366 which, at least in the case of the two front or forward ends of the two rollers is semi-circular in shape and receivable in nested position within the inner ends of the opposed recesses 336 in the front walls 332 where they are releasably secured by suitable means engaged through aligned holes 368 and 370. The corresponding mounting flanges 366 on the rear ends of the two rollers 350 are also to be releasably mounted in a suitable manner, such as by telescopic reception over projecting stub shafts fixed to the rear walls 334 or by being releasably fastened to inwardly projecting mounting flanges or the like, the mounting flanges 366 provided on the rear ends of the rollers 350 of course conforming to the specific mount to be utilized.

The wires 358 which make up the body of the rollers 350 are preferably, in this form, relatively thin stainless steel cylindrical rods having the opposite ends thereof welded to the mounting shoulders 356 on the opposed end collars 352 with each wire spiralling one complete convolution between the mounting shoulders 356. Further, as will be noted in FIGURE 13, the wires 358 on the two rollers 350 spiral in opposite directions whereby, upon a rotation of the rollers 350 in opposite directions so as to move a cut of meat downwardly therebetween, a positive grip on the cut of meat is assured.

The driving of each of the meat gripping and moving rollers 350 is effected by means of a suitable motor 372 mounted on a support platform 374 rigidly engaged with the corresponding section 328 and 330. Each motor 372 is provided with an elongated drive shaft 376 paralleling the corresponding roller along the full length thereof slightly outward and below the roller 350. Each of the drive shafts 376, which may have the forward ends thereof supported with any suitable bearing within the corresponding front wall 332, has a pair of drive gears 378 mounted thereon with these gears 378 in turn meshing with and driving the gears 354 defined on the opposite ends of the rollers 350 whereby a power driving of both ends of each of the rollers 350 is effected. In this manner, there is no tendency for the rollers 350 to twist in that both ends are power driven in a synchronized manner, this in turn assuring a positive gripping and moving of the meat. Both motors 372 are to preferably be controlled from a single off-on switch. Further while the drawings specifically illustrate the use of a pair of drive motors 372, it should be appreciated that, through a suitable transmission, a single motor may be used to effect the desired driving of the rollers.

Positioned longitudinally through both rollers or cylinders 350 are the cleaning elements 380. Each of these elements 380 includes an elongated brush 382 and a rotatably driven shaft 384 upon which the brush 382 is releasably mounted. The brush 382 will normally consist of a hollow central shaft 386 and a plurality of brushing bristles 388 affixed to the shaft and projecting generally radially outward therefrom for brushing engagement with the cut of meat. These bristles 388, while preferably spirally arranged along the length of the shaft 386 as illustrated in the drawings, might be either randomly or uniformly arranged so as to present a substantially solid surface along the length of the shaft 386. The shaft 384, upon which each of the brushes 382 is mounted, extends through the horizontally elongated slot 338 defined in the corresponding rear wall 334 of the framework 326 with the shaft 384, rearwardly of the rear wall 334, being supportingly received within a bearing 390 mounted within an enlarged horizontally sliding mounting block 392, the two blocks 392 enabling a lateral adjustment of the brushes 382 toward and away from each other.

Each rotating shaft 384 extends substantially the full length of the corresponding roller or wire cylinder 350 and slidably receives the hollow brush shaft 386 thereover through the enlarged open forward end of the roller 350 and the front wall recess 336 within which the end collar 352 is mounted. The brush 382 is locked to the shaft 384 through a transverse position pin 394 fixed to the shaft 384 adjacent the rear collar 352 and received within opposed notches 396 on the inner end of the hollow brush shaft 386 whereby relative rotation between the shaft 386 and the shaft 384 is precluded. The shaft 386 is retained in engagement with the transverse projecting pin 394 by means of a suitable nut 398 removably threaded on the externally threaded forward end portion 400 of the shaft 384 whereby a removal of the nut 398 is necessary prior to a removal of the retained brush 382.

Each of the shafts 384 projects rearwardly beyond the corresponding mounting block 392 and has a suitable pulley or the like 402 keyed thereon so as to enable a driving of the cleaning element 380 from the adjoining motor shaft 376 upon which a similar pulley 404 is mounted. Drive belt means 406 are engaged about both pulleys 402 and 404 so as to effect a driving of the corresponding brush 382 in the opposite direction from that in which the corresponding wire roller 350 is to be driven. In order to maintain the proper tension on each of the belts 406 at all times, an idler pulley 408 is provided, this pulley being rotatably mounted on the rear end portion of an eccentric shaft 410 which is in turn rotatably mounted on the corresponding rear wall 334 and constantly resiliently bias toward tensioning engagement with the corresponding belt 406 by a suitable coiled biasing spring 412 engaged about the shaft 410 and fixed to the corresponding rear wall 334. The location and operation of the idlers 408 will be readily apparent from FIGURES 12, 13, and 15.

With reference to FIGURES 13 and 14, it will be noted that both cleaning brushes 382 are to be so located, within the corresponding wire rollers or cylinders, as to have the bristles 384 thereof project inwardly to and slightly beyond the gripping wires 358 along the center of the machine 320 between the sections 328 and 330 for engagement with the cut of meat as it is drawn therethrough by the oppositely rotating rollers 350. These brushes 382 or cleaning elements 380 will normally be mounted at or slightly below the horizontal center line of the rollers 350 so as to enable a proper and firm engagement of the cut of meat by the gripping wires 358 prior to engagement of the brushes 382 with the side or surfaces of the meat.

As noted supra, the cleaning elements 380 are to be adjustable laterally toward and away from each other. This is effected by mounting each of the shaft mounting blocks 392 within a track defining member 414 fixed to each of the rear walls 334 and presenting downwardly and upwardly directed slots 416 which receive upwardly and downwardly projecting flanges 418 integral with each block 392. As will be appreciated, the idlers 408 will maintain the proper tension on the brush driving belts 406 throughout the relatively small range of adjustment contemplated for the brushes 382.

Figure 12:
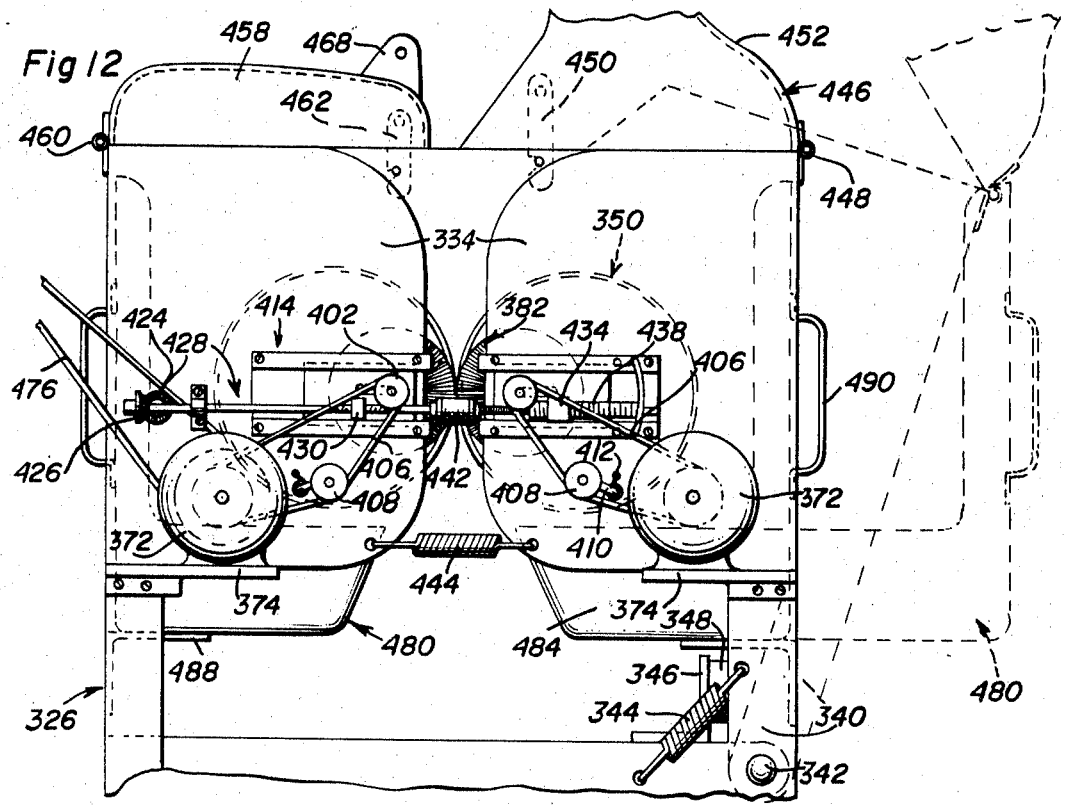
FIGURE 12 is an enlarged partial rear elevational view of the machine of FIGURE 11 illustrating the drive means therefor.
Figures 16, 18:
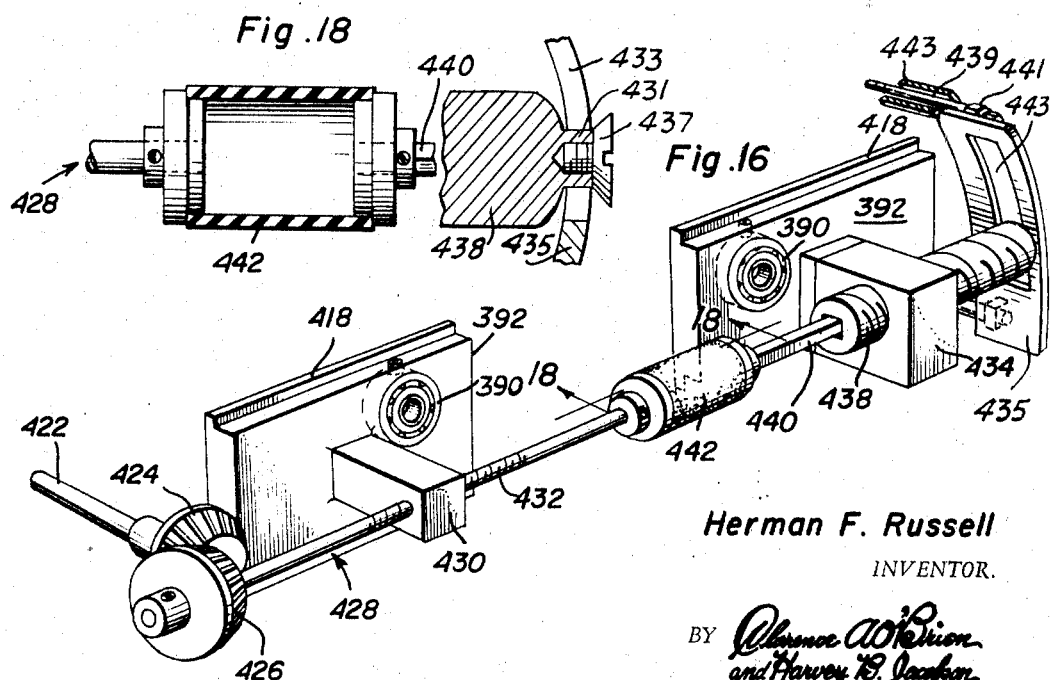
FIGURE 16 is a perspective illustration of the mounting and adjusting means for the cleaning brushes.
FIGURE 18 is an enlarged cross-sectional detail through the brush control shaft taken substantially on the plane passing along line 18—18 in FIGURE 16.

In the illustrated embodiment, the adjustment of both cleaning elements 380 is to be synchronized and effected simultaneously by means of a single control 420 mounted on the front face of the machine 320. This control 420 is directly engaged with an elongated shaft 422 which extends rearwardly through the machine 320 and terminates in a bevel gear 424 which is drivingly engaged with a similar bevel gear 426 mounted on a shaft 428 extending across the rear of the machine 320 rearwardly of the two mounting blocks 392. The mounting block 392 fixed to the rigid section 330 includes a rearwardly extending projection 430 which includes an internally threaded bore therethrough for the threaded reception of an externally threaded portion 432 of the shaft 428 whereby, upon rotation of a shaft 428, a lateral sliding of the mounting block 392 will result. The mounting block 392 associated with the pivotally mounted section 328 also includes a rearwardly extending projection 434 with the projection 434 being pinned, as generally indicated at 436 in FIGURE 17, for rotational movement relative to the corresponding block 392. This projection 434 also includes an internally threaded bore therethrough with this bore receiving an enlarged externally threaded shaft section 438 which is slidably engaged over a rectangular or non-circular portion 440 of the shaft 428 for a keying of the externally threaded shaft section 438 to the shaft 428 so as to enable a non-rotational sliding movement therebetween. The threads on the shaft section 438 are to be the reverse of those on the portion 432 of the shaft 428 whereby, upon rotation of the shaft 428, there will be a simultaneous movement of the mounting blocks 392 either toward or away from each other. With reference to FIGURES 12, 16 and 18 in particular, it will be noted that the rear end of the shaft section 438 has an integral rearwardly extending internally threaded boss 431 thereon which is slidably received through a vertically elongated slot 433 in a vertically extending arcuate plate 435. The boss 431 is retained in sliding engagement within the slot 433 by a suitable headed bolt 437 threaded into the boss 431 from the opposite side of the plate 435 from the shaft section 438. The plate 435 is in turn fixed to the adjacent rear wall 334 by elongated bolts 439 extending through mounting ears 441 on the plate 435, elongated spacing sleeves 443, and into locked engagement with the rear wall 334 in any suitable manner. The spacing sleeves 443 of course orientate the plate 435 so as to align the slot 433 therein with the shaft section 438. As will be appreciated, the purpose of the plate 435 is to preclude longitudinal movement of the shaft section 438 as it is rotated so as to laterally adjust the corresponding cleaning element 380. By the same token, the sliding reception of the shaft section boss 431 within the slot 433, in conjunction with the sliding reception of the shaft portion 140 within the shaft section 438, allows for the lateral movement of the movable section 328 due to the introduction of cuts of meat of varying thicknesses, providing in effect a longitudinally extensible rotatable adjusting shaft.

Finally, it will be noted that a tubular flexible section 442 has been provided centrally along the shaft 428 whereby a flexing of the shaft 428 is possible while at the same time retaining the torsional strength necessary so as to effect the desired rotation of both portions of the shaft 428 to produce the mounting block adjustment. The pivotally mounted shaft receiving projection 434, the slidable shaft section 438, the positioning plate 435, and the flexible shaft section 442 cooperatively function so as to maintain a positive adjusting engagement with the mounting block 392 associated with the pivotally mounted section 328 whereby the desired pivotal movement of the section 328 can be effected while still maintaining control over the adjustment of both blocks 392. Incidentally, with regard to the pivotal movement of the section 328 relative to the section 330, attention is directed to FIGURES 12 and 14 wherein it will be noted that one or more biasing springs 444 may be provided directly between the walls, either 332 or 334, themselves so as to resiliently resist the outward swinging of the section 328 in a manner so as to insure a firm grip on the cut of meat received between the gripping wire rollers 350.

A pivotally mounted cover section 446 is provided over the movable section 328 and hinged, as at 448, along the outer edge thereof for movement between a first position overlying the section 328 and a second position swung outwardly therefrom so as to enable free access to the roller 350 therein. This section 446, referring to FIGURE 11, can include a suitable latch 450 thereon for a locking thereof in its roller covering position. The cover 446 includes an upwardly and forwardly curving back wall 452 which acts so as to downwardly deflect any scraps which might be thrown upwardly by the corresponding brush 382. The inner end of the cover 446 terminates in a vertical backstop or wall 454 vertically aligned over the corresponding roller 350 and slightly rearward of the leading portion thereof. This vertically orientated backstop 454, which terminates in spaced relation above the lower portion of the cover 446 so as to allow free access to the meat gripping rollers by a substantially vertical dropping of a cut of meat, is of significance in providing for a substantially automatic orientation of the cut of meat for engagement by the gripping rollers 350. In actual use, when a cut of meat is taken from the saw table, the meat can be merely swung outwardly into engagement with the backstop or wall 454 and released for guided engagement into the rollers 350. When working with large cuts of meat, the impact against the backstop 454 will also tend to slightly open the space between the rollers 350 so as to insure a proper introduction therebetween. The provision of this backstop 454 is particularly significant when utilizing the machine 320 in large volume operations wherein a substantially continuous flow of meat from the meat saw is effected. With the instant machine, including the backstop 454, the operator of the saw need merely, with substantially no slacking of his cutting pace, swing each cut of meat away from the saw and against the backstop 454 with the machine 320 at that point automatically receiving and guiding the cut into the gripping rollers which in turn move the cut through the cleaning elements 380 and subsequently discharge the cut into enlarged adjacent receiving lugs 456.

A cover 458 is also hingedly mounted over the rigid section 330 and includes an arcuate configuration for also assisting in preventing an upward flying of the scraped particles. The cover 458 is preferably to be hinged along the outer portion of the section 330 as at 460, and includes a suitable pivoted latch 462 for locking the cover 458 in its section closing position. Upon an outward pivoting of the cover 458 free access will be allowed to the roller 350 and cleaning element 380 of the section 330 in the same manner as that obtained by an outward pivoting of the cover 446.

A second meat guiding means is provided on the cover 458 and operates, in conjunction with the back wall 454, so as to insure a proper introduction of all cuts of meat with little or no effort on the part of the operator. This second guiding means consists of a full width endless conveyor belt 464 engaged about a first roller 466 mounted for free rotation between a pair of upwardly projecting ears 468 on the forward or inner portion of the cover 458 and a second elongated roller 470 rotatably mounted between a pair of elongated outwardly projecting arms 472 rigid with the side wall of the machine 320 below the mounting hinge 460 associated with the cover 458. The second roller 470 includes a pulley 474 keyed to one end thereof and drivingly engaged, through a crossed endless belt 476, with a second pulley 478 keyed to and driven by the motor drive shaft 376 associated with the section 330. In this manner, it will be recognized that the conveyor 464 is continuously driven during the operation of the machine 320. It should of course be appreciated that the relationship between the pulleys 474 and 478 is such so as to result in a relatively slow driving of the conveyor 464, the speed of which may be further reduced, if necessary, in any conventional manner. This conveyor 464, the use of which is optional, finds particular utility with smaller cuts of meat which can be merely dropped or thrown thereonto for subsequent depositing through the open top of the machine between the gripping rollers 350. Further, by mounting the conveyor 464 as described supra, and as illustrated in FIGURE 11, it will be appreciated that it will not interfere with the opening of the associated cover 458 upon a release of the latch 462 associated therewith.

The opposed rollers 350 rotate inwardly and downwardly relative to each other so as to grip and move the cut of meat past the upwardly and outwardly rotating brushes at a steady constant rate which insures a complete engagement and cleaning of both sides of the cut of meat by the brushes 382. Once the meat has been drawn through the brushes 382, the cut of meat is dropped into the receiving lug or tub 456 located within the framework 326 immediately below the section 328 and 330. This lug 456, noting FIGURE 11, is slidably received within the open front wall of the machine 320 and can be either of two vertically aligned lugs which are individually slidably mounted on shoulders 457 for quick removal. Using two lugs 456 in this manner enables the operator of the device to maintain a substantially continuous operation of the machine 320 in that upon a filling of the upper lug 456, it can be removed with the continuous flow of meat subsequently dropping directly through the machine and into the lower lug 456. Upon filling of the lower lug 456, the emptied upper lug 456 can be replaced while the lower lug 456 is being emptied.

In order to catch the scraps, bone dust, marrow and the like scraped or brushed from the opposite surfaces of the cut of meat, a pair of scrap trays 480 are provided. Each of the scrap trays 480, when being inserted through an opening 482 provided therefor in the outer side of each of the sections 328 and 330, includes a relatively wide lower portion 484 which projects inwardly beneath the corresponding roller 350 and cleaning element 380, and a high flanged rear wall 486 which projects substantially up to the top of the corresponding section, either 328 or 330. Each of the scrap trays 480 is supported on an inwardly extending ledge or shelf 488 projecting inwardly of the corresponding opening 482 whereby each scrap tray 480 need merely be slid into the opening 482, or correspondingly, slid outwardly therefrom for emptying or cleaning. As will be appreciated from FIGURE 12, the scrap tray 480 associated with the section 328 is supported so as to ride along with the section whereby it is always maintained in scrap relieving relationship to the associated wire gripping roller 350 and cleaning element 380. Further, in order to facilitate the handling of the scrap trays 480, it will be noted that each is provided with an outwardly projecting handle 490 thereon. The high rear wall 486 of each of the scrap trays 480, in conjunction with the corresponding cover 446 or 458 receives and directs all of the removed material into the relatively shallow tray portion 484 for collection and subsequent disposal.

As noted previously, the brushes 382 are to be mounted for removal through the front of the machine 320. Accordingly, in order to provide access to the forward end of the wire gripping rollers through the framework enclosing housing, a suitable hingedly mounted access door or panel 492 is provided on that portion of the housing associated with each of the sections 328 and 330. The access panels 492 may be provided with a suitable handle 494 or the like. Further, it should be appreciated that that portion of the housing associated with the movable section 328 is mounted solely on this section 328 so as to move in conjunction therewith relative to the remainder of the structure.

In use, the machine 320 of the instant invention will normally be positioned adjacent the discharge end of a conventional meat saw whereby the meat cutter can remove each cut of meat and with substantially no additional effort, introduce it into the meat cleaning machine. This introduction of each cut of meat can be effected through a positioning of the meat, especially when smaller cuts are involved, on the conveyor for discharge between the gripping rollers, or the cut of meat can be brought into engagement with the backstop or back wall 454 for a vertical sliding through the open top of the machine. Further, inasmuch as the meat will, in big operations, normally be handled very rapidly with the cuts of meat brought quickly off of the meat saw table, the vertical backstop 454 allows the operator to merely slap the cut of meat against the back wall and immediately release it, thereby requiring very little accuracy and substantially no waste of time. Further, inasmuch as the section 328 is pivotally mounted so as to allow for an automatic adjustment of the space between the gripping rollers 350, the engagement of a relatively large cut of meat against the back wall 454 will result in an automatic slight opening of the rollers relative to one another for the reception of the cut, the biasing effect of the various springs associated with the pivoting section 328 insuring a proper gripping of the meat between the rollers 350. The gripping of the meat by the rollers 350 provides an even positive movement of the meat between the cleaning brushes 382 with this movement being relatively slow so as to insure a complete cleaning of both surfaces of the cut of meat. The brushes will normally be positioned so as to project through the wire rollers 350 whereby a positive brushing engagement with the meat is insured. Further, these brushes are mounted for quick removal through the forward wall of the machine 320 for replacement, cleaning, etc. In addition, each of the brush units are mounted for simultaneous adjustment toward and away from each other so as to vary the degree of engagement with the meat, such as may be necessary with different types of meat or different cuts. Once the meat has been moved through the cleaning brushes 382, it is released by the gripping rollers or cylinders 350 and deposited in adjacent lugs for subsequent disposal, with the scraps, bone dust, etc. being deposited in scrap trays located beneath the brushes and gripping rollers and just lateral of the path taken by the meat as it is dropped into the lugs.

If deemed necessary, the individual gripping wires 358 can have the surfaces thereof roughened so as to enable a positive gripping of the meats. Further, in view of the enlarged nature of the gripping rollers 350, it will be appreciated that relatively thick cuts of meat can be fed therebetween with the section 328 automatically pivoting outwardly against the biasing force of the retaining springs so as to accommodate the meat. Incidentally, with regard to the outward pivoting of the section 328, it will also be appreciated that the driving motor 372 associated therewith is mounted directly on the section 328 itself so as to swing along therewith and maintain the desired driving engagement with both the associated cylinder 350 and cleaning brush 382.

Both of the sections 328 and 330 are provided with hingedly mounted covers which can be opened outwardly so as to allow free access to the interior of the machine for any cleaning or other maintenance work which might be necessary, the utilization of stainless steel wires 358 enabling one to actually hose out the interior of the machine at the end of a day's operation. Furthermore, it should be recognized that these wires 358 are spaced sufficiently apart so as to allow for substantially free passage of the brush bristles 388 therethrough and into engagement with the meat, while at the same time providing for a positive gripping of the meat itself. It will of course be appreciated that the brushes both rotate upwardly and outwardly generally opposed to the direction of movement of the cut of meat so as to insure a positive scraping engagement therewith.

Figure 21:
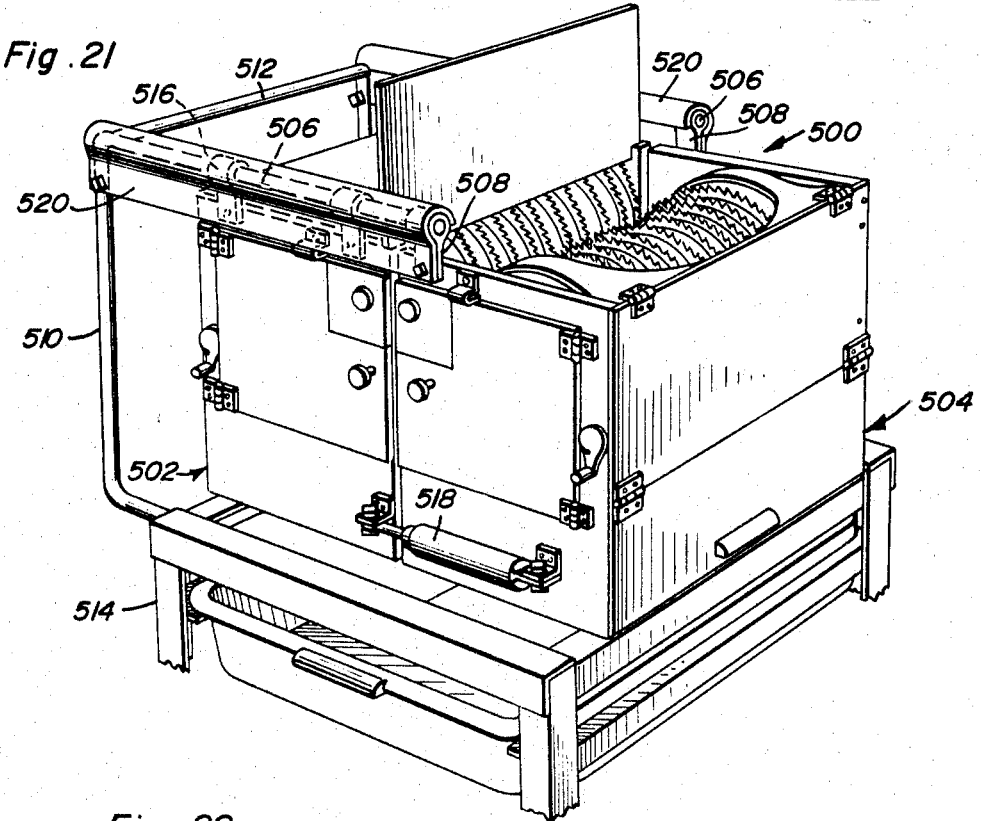
FIGURE 21 is a perspective view similar to FIGURE 1 of yet another form of the meat cleaning machine.
Figure 22:
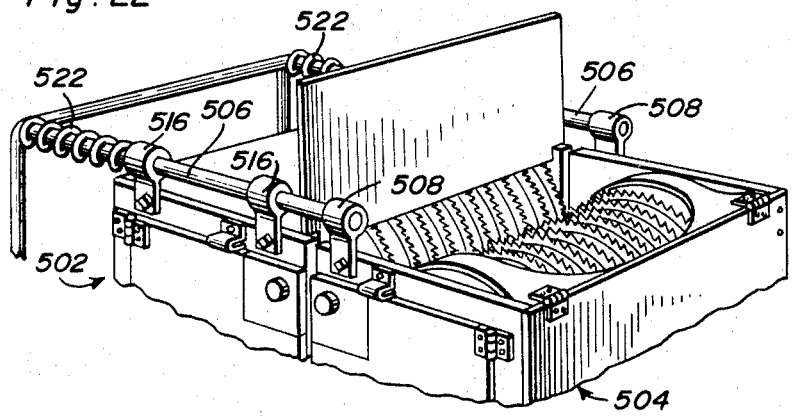
FIGURE 22 is a perspective view of the upper portion of the machine of FIGURE 21 detailing a modified form of section biasing means.

Reference is now had to FIGURE 21 and 22 wherein reference numeral 500 is used to designate yet another form of the meat cleaning machine of the instant invention. This machine 500 closely resembles machine 20, illustrated in FIGURES 1 through 10, differing therefrom primarily by the fact that the movable section 502 is slidably mounted for movement relative to the fixed section 504 an a pair of overhead rails 506 rather than the base rails or rods 58.

The two rails 506 overlie the front and rear walls of the movable section 502 in vertically spaced relation thereabove and are fixedly positioned by a mounting bracket 508 securing the inner end of each rail 506 to the fixed section 504, and by appropriate vertical and horizontal rods or braces 510 and 512 engaged both between the two outer ends of the rails 506 and each rail outer end and the adjacent supporting base 514. The movable section 502 is suspended from the rail 506 by a pair of bearings 516 which are received over each rail 506 and, through a depending strap portion, are secured to the corresponding front or rear wall of the movable section 502 in any appropriate manner as will be readily appreciated from FIGURES 21 and 22. These bearings 516 both suspend the section 502 and provide for the lateral movement thereof along the rails 506. The section 502, in common with the previously described devices is to be resiliently biased toward the fixed section 504, FIGURE 21 illustrating such a biasing being effected by a conventional hydraulic type closure or dashpot 518 secured to the two sections 502 and 504 in a manner so as to effect a constant biasing pull on the section 502 toward the fixed section 504. One such unit 518 can be provided on both the front walls and the rear walls of the sections as required.

A cover 520 will normally be utilized so as to enclose and protect the sliding bearings 516, such a cover being mounted in any appropriate manner such as by bolting the opposed ends thereof to the fixed section 504 and the vertical bracing rod 510 associated with each rail 506. The covers or guards 520 will of course not interfere with the desired sliding movement of the movable section 502.

FIGURE 22 specifically illustrates a modified means for effecting the desired resilient biasing of the movable section 502 toward the fixed section, such consisting of a pair of expanded coiled compression springs 522 mounted on the rails 506 between the outermost bearing units 516 and the outer end of the rails 506. It is also contemplated that an appropriate guard similar to the guard 520 will be used in conjunction with the machine of FIGURE 22 so as to provide a protective enclosure for the rails 506 and sliding bearings 516 thereon. The various operating features of the machine 500 will closely follow those of the machine 20 with the provision of the overhead rails 506 rather than the subjacent rails or shafts 58 resulting possibly in a cleaner operation with no drippings or scraps falling on the section mounting rails.

Figure 23:
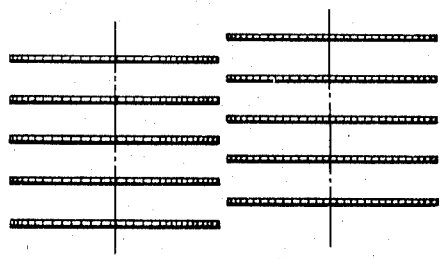
FIGURE 23 is a schematic illustration of a staggered orientation of the blades of the opposed rollers.

Finally, noting FIGURE 23, if so desired in those cylinders formed of annular rings or blades, the blades in each cylinder can be staggered relative to the blades in the other cylinder so as to possibly effect a better grip on the received meat.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A meat cleaning machine for receiving and automatically cleaning a cut of meat, said machine including meat gripping and moving means for engaging a cut of meat and moving the meat along a specific linear path, means for engaging and cleaning the opposite sides of a cut of meat as it is moved along the linear path, and positioning means independent of the gripping and moving means for receiving and properly positioning a cut of meat for gripping engagement by said gripping and moving means, said gripping and moving means comprising a pair of elongated laterally spaced cylindrical members, said cylindrical members comprising a plurality of gripping wires spaced from each other and defining an open cylindrical body for effecting a non-compacting positive gripping of a cut of meat.

2. The machine of claim 1 including a vertical framework, said framework including a pair of laterally spaced sections one of said cylindrical members being mounted on each section in a manner so as to define a vertical space therebetween for the passage of a cut of meat therethrough, and means mounting one of said sections for resiliently resisted movement of the cylindrical member thereon away from the member on the second station.

3. The machine of claim 2 wherein said means for engaging and cleaning the opposite sides of a cut of meat comprises a pair of elongated brushes, one brush being positioned longitudinally within each cylindrical member adjacent the vertical space defined between said members, and means mounting said brushes for lateral adjustment toward and away from each other.

4. The machine of claim 3 wherein said positioning means includes a substantially vertical wall mounted on the movable section in upwardly spaced relation to, and in general alignment with, the space defined between the cylindrical members.

5. The machine of claim 3 including drive means for rotationally driving said cylindrical members in opposite directions inwardly and downwardly relative to the intermediate space, and for rotationally driving said brushes in opposite directions relative both to each other and to the members within which they are positioned so as to rotate upwardly and outwardly relative to the defined intermediate space.

6. The machine of claim 2 wherein said one section is mounted for lateral sliding movement relative to the second section.

7. The machine of claim 1, wherein said gripping wires comprises a series of longitudinally aligned spaced coaxial generally flat blade-like rings.

8. The machine of claim 7, wherein said rings include outwardly projecting gripping teeth peripherally thereabout.

9. The machine of claim 5, wherein each of said framework sections includes a forward and a rear wall, each cylindrical member comprising a pair of annular end collars, said collars each including inner and outer bearing confining races, said inner races including mounting means thereon engageable with the forward and rear walls of the corresponding section, said wires being fixed to the outer races for rotation therewith, at least the inner races mounted on the forward walls being annular and defining an opening into the corresponding cylindrical member for the insertion and removal of the corresponding brush.

10. The machine of claim 9, wherein the mounting means on each inner race fixed to the forward walls comprises a laterally projecting arcuate flange, each forward wall defining an arcuate recessed seat receiving the arcuate flange of the corresponding inner race, and means fixing each flange in its recessed seat.

11. The machine of claim 3, wherein the means mounting said brushes comprises a pair of elongated brush mounting shafts, one extending freely through each member and beyond one end thereof, the projecting end of each shaft being rotatably supported within a mounting block, each mounting block being mounted on the corresponding section for horizontal sliding movement, a pair of horizontally aligned internally threaded bores defined through portions of each mounting block, the bores being oppositely threaded, an elongated shaft extending through said bores and having externally threaded sections thereon threadedly engaged within said bores whereby a rotation of this shaft will produce a movement of the mounting blocks in opposite directions, either toward or away from each other.

12. The machine of claim 11, wherein the shaft extending through the mounting block bores has a flexible part therein between the mounting blocks, the externally threaded shaft section received through the block associated with the movable section comprising an externally threaded sleeve slidably mounted on the shaft, that portion of this latter block having the bore therethrough being pivotally mounted on the block, whereby movement of the movable section can be accommodated.

13. The machine of claim 2, wherein each cylindrical member comprises a pair of annular end collars, said gripping wires extending between said collars and having the opposite ends thereof fixed to said collars, said wires being circumferentially spaced from each other and extending on spiral paths from one collar to the other.

14. A meat cleaning machine comprising a vertical frame, a pair of parallel laterally spaced horizontal cylinders rotatably mounted on said frame and defining a vertical path therebetween, each cylinder comprising an open body defined by a plurality of spaced meat gripping wire-like members, means for rotating said cylinders in opposed directions inwardly toward each other for moving a cut of meat downwardly therebetween, an elongated brush positioned longitudinally within each cylinder, and means rotatably mounting each brush on said frame for rotation in a direction opposite from that of the corresponding cylinder for effecting a brushing of the opposed surfaces of a cut of meat moved downwardly therepast by said cylinders.

15. The machine of claim 14 wherein said gripping wire-like members comprise a series of longitudinally aligned spaced coaxial generally flat blade-type rings.

16. The machine of claim 14 wherein each cylinder includes a pair of end collars, a pair of longitudinally aligned bearing units mounted on the frame in association with each cylinder, and cooperating means on said collars and said bearing units for releasably locking each cylinder to the corresponding bearing units.

17. The machine of claim 16 wherein said cooperating means comprise projecting studs on said bearing units and stud receiving apertures defined within said end collars, said frame including an outwardly movable door panel adjacent one end of each cylinder, the bearing unit associated with that end of each cylinder adjacent the door panel being mounted on said door panel for movement away from the corresponding cylinder end upon movement of the door panel, this effecting a retraction of the corresponding collar engaging studs.

18. The machine of claim 14 including means for resiliently biasing one cylinder and its contained brush toward the other cylinder so as to enable the accommodation of different thickness cuts of meat therebetween.

19. The machine of claim 14 including a meat guiding upwardly projecting vertical wall generally aligned over said vertical path and acting as positioning wall for a cut of meat to be introduced between said cylinders.

20. The machine of claim 14 including an endless meat conveyor mounted in overlying relation to one of said cylinders, said conveyor discharging inwardly and downwardly between said cylinders.

21. The machine of claim 14 including a pair of scrap receiving trays, one being removably mounted on the fram adjacent each cylinder, each tray having a receptacle portion underlying the corresponding cylinder and a vertically elongated back wall positioned laterally outward of the cylinder and extending thereabove, the receptacle portions terminating in laterally spaced relation to each other vertically below said vertical path.

22. The machine of claim 21 including a pair of vertically aligned meat receiving lugs removably mounted on said frame below said cylinders and in alignment with said vertical path, and means mounting said lugs whereby free access will be had to the lower lug from the vertical path between the cylinders upon the removal of the upper lug.

23. An automatic meat cleaning machine for receiving and cleaning a cut of meat, said machine including a pair of opposed inwardly opening sections, a base structure, means mounting said sections on said base structure, enlarged endless open network meat gripping and moving means mounted within each section for travel in a path to grip and convey the meat therebetween, said gripping and moving means being orientated in generally parallel opposed relation to each other adjacent the lateral inner sides of said sections for engagement with a cut of meat positioned between said sections, means for moving said gripping and moving means in opposed paths, and means positioned within each gripping and moving means for engaging and cleaning the opposite sides of a cut of meat moved thereby, at least one of said gripping and moving means comprising a generally cylindrical rotatable roller.

24. The machine of claim 23 wherein both of said gripping and moving means comprise generally cylindrical rotatable rollers.

25. The machine of claim 24 wherein said sections are mounted for relative movement away from and toward each other, and means biasing said sections toward each other.

26. The machine of claim 25 wherein one of said sections is mounted for lateral sliding movement relative to the second section.

27. The machine of claim 24 wherein said means for cleaning a cut of meat comprises, in each instance, an elongated brush extending through the corresponding roller, means rotatably mounting each brush, and means for rotatably driving said brushes in opposed directions both to each other and to the corresponding rollers, each of said brushes including brush bristles thereabout, said bristles projecting through the corresponding roller for engagement with a gripped cut of meat.

28. The machine of claim 24 wherein a first one of said sections includes an open top exposing the top of the corresponding roller along a major portion of the length thereof for the introduction of a cut of meat thereonto.

29. The machine of claim 27 wherein each roller comprises a series of longitudinally aligned spaced coaxial wire-like rings rigidly interconnected into a single unit by peripherally spaced longitudinally extending securing rods attached to the rings.

30. The machine of claim 29 wherein said roller securing rods, at the opposed ends thereof, mount a pair of annular mounting collars, means releasably affixing said mounting collars to a pair of longitudinally aligned bearing units, each of said sections including front and rear wall portions, and means mounting said bearing units within the front and rear wall portions.

31. The machine of claim 30 wherein the means are fixing the mounting collars to the bearing units comprise projecting studs on said bearing units and stud receiving apertures defined within the mounting collars, the front wall portion of each section being outwardly swingable relative to the contained roller, the bearing unit mounted on each front portion being disengageable from the adjacent roller upon an outward swinging of the front wall portion.

32. The machine of claim 29 wherein said rings are in the nature of flat annular blades and include a plurality of meat gripping teeth defined peripherally thereabout.

33. The machine of claim 29 including a longitudinally extending splash guard within each roller in overlying relation to the corresponding brush, said guard being generally horizontally orientated and including a downwardly arcing laterally outward edge and a flexible laterally inward edge, said flexible edge including a series of slots defined therein, said slots receiving the rings of the corresponding roller at a point generally directly over the lateral inner portion of the corresponding brush.

34. The machine of claim 33 including mounting means for each guard, said mounting means comprising a slot defined on the inner surface of one wall portion of the corresponding section for the sliding reception of the corresponding end of the guard, and bolt means for releasably affixing the second end of the guard to the second wall portion of the section.

35. The machine of claim 26 wherein the means mounting said one of said sections comprises a pair of elongated rods fixed at laterally spaced points to said base structure, a plurality of mounts slidably received on said base mounted rods, said mounts being fixedly attached to said one section for a movement of said one section therewith along said base mounted rods toward and away from the second section, the movement of said one section being responsive to engagement of the one section roller against a cut of meat of a thickness greater than the distance between the two rollers.

36. The machine of claim 26 wherein the means mounting one of said sections comprises a pair of elongated rails fixed relative to said base structure in laterally spaced overlying relation to said one section, a plurality of mounts slidably received on said rails, said mounts being fixedly attached to one section for movement of said one section therewith along said rails toward and away from the second section, the movement of said one section being responsive to engagement of the one section roller against a cut of meat of a thickness greater than the distance between the two rollers.

37. The machine of claim 23 wherein said cylinder includes a pair of end collars, a pair of longitudinally aligned bearing units mounted on the corresponding section, and cooperating means on said collars and said bearing units for releasably locking said roller to the bearing units, said cooperating means comprising projecting studs on said bearing units and stud receiving apertures on the roller end collars.

38. A meat cleaning machine for receiving and automatically cleaning a cut of meat, said machine including a support structure, meat gripping and moving means movably mounted on said structure for engaging a cut of meat and moving the meat along a specific path through said structure, and means mounted on said structure for engaging and cleaning the meat as it is moved along the path, said gripping and moving means comprising a pair of opposed gripping members in facing relation to each other on opposite sides of said path, the facing portions of said gripping members being movable in a common direction along said path, said cleaning means comprising a pair of cleaning members mounted outward of the facing portions of said gripping members and projecting inward thereof into said path, means for adjusting the amount of projection of said cleaning members into said path, said opposed gripping members defining elongated cylinders, each of said cylinders comprising a plurality of spaced wire-like elements for effecting a noncompacting positive gripping of a cut of meat, and means for simultaneously moving said elements about the longitudinal axis of said cylinder.

39. The machine of claim 38 wherein the elements of each cylinder comprise a plurality of coaxial laterally spaced rings, and means mounting the rings of each cylinder for rotation about their common axis.

40. The machine of claim 39 wherein each of said cleaning members comprises an elongated brush extending through the corresponding cylinder and having the bristles thereof projecting laterally through the spaced elements, said means for adjusting the amount of projection comprising an elongated central shaft, a mounting block, bearing means on said block rotatably mounting said brush shaft, and means mounting said block on said supporting structure for an adjustment thereon in a direction laterally of the axis of the brush shaft.

41. The machine of claim 40 including a scrap receiving container mounted on said support structure in receiving position below each cylinder and outward of the meat path, and an arcuate deflector extending longitudinally through each cylinder outward of the brush for the deflection of brush-thrown scraps into the corresponding container.

References Cited

UNITED STATES PATENTS

| 1,670,809 | 5/1928 | Hormel | 15—3.17 |
| 1,817,332 | 8/1931 | Worrall | 15—77 |
| 2,358,334 | 9/1944 | Knowlton | 15—77 X |
| 3,102,290 | 9/1963 | Sannes | 15—3.17 |

EDWARD L. ROBERTS, *Primary Examiner.*

U.S. Cl. X.R.

15—77